US 12,004,221 B2

United States Patent
Kadiri et al.

(10) Patent No.: US 12,004,221 B2
(45) Date of Patent: Jun. 4, 2024

(54) TRUNCATED IDENTIFICATION INDICATORS FOR EARLY USER EQUIPMENT (UE) CAPABILITY RETRIEVAL

(71) Applicant: QUALCOMM Incorporated, San Diego, CA (US)

(72) Inventors: Prasad Reddy Kadiri, San Diego, CA (US); Bharat Shrestha, San Diego, CA (US); Mungal Singh Dhanda, Slough (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/326,229

(22) Filed: May 20, 2021

(65) Prior Publication Data

US 2021/0368547 A1 Nov. 25, 2021

Related U.S. Application Data

(60) Provisional application No. 63/028,547, filed on May 21, 2020.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0044* (2013.01); *H04W 8/02* (2013.01);
(Continued)

(58) Field of Classification Search
CPC ... H04W 74/0833; H04W 8/02; H04W 8/245; H04W 60/00; H04W 76/10; H04W 8/26;
(Continued)

(56) References Cited

U.S. PATENT DOCUMENTS 11,382,151 B2 * 7/2022 Griot ................... H04L 1/003
11,546,950 B2 1/2023 Kadiri et al.
(Continued)

FOREIGN PATENT DOCUMENTS

WO WO-2019193562 A1 10/2019

OTHER PUBLICATIONS

"3rd Generation Partnership Project, Technical Specification Group Radio Access Network, Evolved Universal Terrestrial Radio Access (E-UTRA), Radio Resource Control (RRC), Protocol specification (Release 13)", 3GPP Standard, 3GPP TS 36.331, 3rd Generation Partnership Project (3GPP), Mobile Competence Centre, 650, Route Des Lucioles, F-06921 Sophia-Antipolis Cedex, France, vol. RAN WG2, No. V13.1.0, Apr. 1, 2016 (Apr. 1, 2016), pp. 1-551, XP051088537, [retrieved on Apr. 1, 2016] section 6.3.2 (p. 318 in particular).
(Continued)

*Primary Examiner* — Eric Myers
(74) *Attorney, Agent, or Firm* — Shumaker & Sieffert, PA

(57) ABSTRACT

A base-station (BS) receiving a random access request from user equipment (a UE), followed by a connection request. The connection request contains UE identity information which may have one of multiple formats depending on whether the access request and/or the connection request indicate that the UE is operating as a bandwidth-limited (BL) UE, an enhanced coverage (CE) UE, or a UE that operates in neither the BL mode nor the CE mode. In the BL mode, the UE may transmit a truncated identifier that is sufficient for the BS to retrieve capability information for the UE prior to transmitting a resource grant to the UE. The BS may then configure the UE and BS to using a radio configuration optimized for the UE's capabilities and transmit the resource grant in accordance with the optimized configuration.

23 Claims, 23 Drawing Sheets

(51) Int. Cl.
   *H04W 8/02* (2009.01)
   *H04W 8/24* (2009.01)
   *H04W 60/00* (2009.01)
   *H04W 76/10* (2018.01)
(52) U.S. Cl.
   CPC ........... *H04W 8/245* (2013.01); *H04W 60/00* (2013.01); *H04W 76/10* (2018.02)
(58) Field of Classification Search
   CPC ..... H04W 76/11; H04W 88/02; H04W 88/08; H04W 8/24; H04L 5/0044
   See application file for complete search history.

(56) References Cited

U.S. PATENT DOCUMENTS

| | | | |
|---|---|---|---|
| 2019/0150218 A1 | 5/2019 | Futaki | |
| 2021/0212147 A1 | 7/2021 | Zheng et al. | |
| 2021/0259031 A1 | 8/2021 | Kadiri et al. | |
| 2022/0264305 A1* | 8/2022 | Hu | H04W 76/20 |

OTHER PUBLICATIONS

Co-pending U.S. Appl. No. 17/326,229, inventor Kadiri; Prasad, filed on May 20, 2021.
International Search Report and Written Opinion—PCT/US2021/033699—ISA/EPO—dated Sep. 29, 2021.
Qualcomm Inc: "Early UE Capability Retrieval Enhancements for eMTC/5GC", 3GPP Draft, 3GPP TSG-RAN WG2Meeting #109bis-e, R2-2002610 Revision of R2-2000536, 3rd Generation Partnership Project (3GPP), Mobile Competence Centre, 650, Route Des Lucioles, F-06921 Sophia-Antipolis Cedex, France, vol. RAN WG2, No. Online Meeting, Apr. 20, 2020-Apr. 30, 2020 Apr. 10, 2020 (Apr. 10, 2020), XP051870871, 5 Pages, Retrieved from the Internet: URL:https://ftp.3gpp.org/tsg_ran/WG2_RL2/TSGR2_109bis-e/Docs/R2-2002610.zip R2-2002610_Early UE.
Qualcomm Inc: "Early UE Capability Retneval Enhancements for eMTC75GC", 3GPP Draft, 3GPP TSG-RAN WG2 Meeting #109e, R2-2000536, 3rd Generation Partnership Project (3GPP), Mobile Competence Centre, 650, Route Des Lucioles, F-06921 Sophia-Antipolis Cedex, France, vol. RAN WG2, No. E-Meeting, Feb. 24, 2020-Mar. 6, 2020 Feb. 13, 2020 (Feb. 13, 2020), XP051849117, 4 Pages, Retrieved from the Internet: URL:https://ftp.3gpp.org/tsg_ran/WG2_RL2/TSGR2_109_e/Docs/R2-2000536.zip R2-2000536_Early UE Capability Retrieval Enhancements_v3.doc.
Qualcomm Inc, et al., "Early UE Capability Retrieval Enhancements for eMTC/5GC", 3GPP Draft, 3GPP TSG-RAN WG2 Meeting #111e, R2-2006792 Revision of R2-2004841, 3rd Generation Partnership Project (3GPP), Mobile Competence Centre, 650, Route Des Lucioles, F-06921 Sophia-Antipolis Cedex, France, vol. RAN WG2, No. E-Meeting, Aug. 17, 2020-Aug. 28, 2020 Aug. 7, 2020 (Aug. 7, 2020), XP051911699, 10 Pages, Retrieved from the Internet: URL:https://ftp.3gpp.org/tsg_ran/WG2_RL2/TSGR2_111-e/Docs/R2-2006792.zip - R2-2006792 Early UE Capability.
International Preliminary Report on Patentability—PCT/US2021/033699, The International Bureau of WIPO—Geneva, Switzerland, dated Dec. 1, 2022.
Huawei, et al., "Support of RRC Connection Re-Establishment for the Control Plane for NB-IoT Connected to 5GC", 3GPP TSG-RAN WG2 Meeting #108, 3GPP Draft; R2-1915318, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 18, 2019-Nov. 22, 2019, pp. 1-5, Nov. 8, 2019 (Nov. 8, 2019), XP051817153, Retrieved from the Internet: URL: https://ftp.3gpp.org/tsg_ran/WG2_RL2/TSGR2_108/Docs/R2-1915318.zip R2-1915318 RRC Connection Reestablishment for CP in SGC.docx [retrieved on Nov. 8, 2019] the whole document.
Qualcomm Incorporated: "Discussion on System Aspects of Connection Reestablishment for Control Plane for NB-Iot", 3GPP Draft; SA WG2 Meeting #135, S2-1909912_DP_REESTABLISHMENT_R2_LS_R2-1908264 V2, 3rd Generation Partnership Project (3GPP), Mobile Competence Centre, 650, Route Des Lucioles, F-06921 Sophia-Antipolis Cedex, France, vol. SA WG2, No. Split, Croatia; Oct. 14, 2019-Oct. 18, 2019, 3 Pages, Oct. 4, 2019 (Oct. 4, 2019), XP051802105, Retrieved from the Internet: URL: https://ftp.3gpp.org/Meetings_3GPP_SYNC/SA2/Docs/S2-1909912.zip S2-1909912_DP_Reestablishment_R2_LS_R2-1908264_v2.doc [retrieved on Oct. 4, 2019] the whole document.
SA2: "[Draft] Reply LS on RRC Connection Re-Establishment for CP for NB-IoT", 3GPP Draft, SA WG2 Meeting #134, S2-1907103_LS_OUT_RAN2_REESTABLISHMENT_NBI_OT, 3rd Generation Partnership Project (3GPP), Mobile Competence Centre, 650, Route Des Lucioles, F-06921, Sophia-Antipolis Cedex, France, vol. SA WG2, No. Sapporo, Japan; Jun. 24, 2019-Jun. 28, 2019, Jun. 17, 2019 (Jun. 17, 2019), XP051752079, 8 Pages, Retrieved from the Internet: URL: http://www.3gpp.org/ftp/tsg%5Fsa/WG2%5FArch/TSGS2%5F134%5FSapporo/Docs/S2%2D1907103%2Ezip [retrieved on Jun. 17, 2019] the whole document.

* cited by examiner

TRUNCATED IDENTIFICATION INDICATORS FOR EARLY USER EQUIPMENT (UE) CAPABILITY RETRIEVAL

CROSS-REFERENCE TO RELATED APPLICATIONS

This application claims priority to and the benefit of Provisional Patent Application No. 63/028,547, filed in the United States Patent and Trademark Office on May 21, 2020, the entire content of which is incorporated herein by reference as if fully set forth below in its entirety and for all applicable purposes.

This application is related to U.S. Non-Provisional application Ser. No. 17/154,921, filed Jan. 21, 2021, which claims priority to U.S. Provisional Application No. 62/975,939; the entire content of these applications are also incorporated herein by reference as if fully set forth below and for all applicable purposes.

TECHNICAL FIELD

This disclosure relates generally to wireless communications and, more specifically, using signaling and indications corresponding to device capability (e.g., truncated identification indicators). Aspects and techniques discussed below can enable and provide early indication of device capabilities to aid in configuring communication links between devices of various capabilities for improved user experience, power conservation, system throughput, and device operation efficiencies.

DESCRIPTION OF RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

BRIEF SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect of the disclosure, a method for wireless communication is provided. The method may be performed by a base station (BS) in communication with a core network. The method includes receiving a first random access (RA) preamble from user equipment (a UE) via a transceiver. The method also includes transmitting to the UE, via the transceiver, a first random access response (RAR) based on the first RA request. The method also includes receiving, via the transceiver, a first radio resource control (RRC) connection request associated with the first RA request. The method also includes sending a first UE context request to the core network, and receiving capability information corresponding for the UE originating the first RA request from the core network. The first UE context request including a first UE identifier (UEID) generated based on the first connection request. The method also includes transmitting, via the transceiver, first RRC configuration information to the UE using a signaling radio bearer (SRB) configured according to the capability information.

In another aspect, a method for wireless communication may be performed by a UE in communication with a BS. The method includes receiving truncation instructions and transmitting, via a transceiver to the BS, in a first radio resource control (RRC) connection request, a truncated identifier generated according to the truncation instructions and based on a UE identifier (UEID) of the UE. The method also includes communicating with the BS via the transceiver using a communication configuration associated with a UE type indicated by the truncated identifier.

In another aspect a wireless communication device operable as a BS is provided. The device includes a processor memory coupled to the processor; and a transceiver coupled to the processor. The processor and the memory are configured to cause the BS to receive, via the transceiver, a first random access (RA) preamble from a UE. The processor and the memory are also configured to cause the BS to receive, via the transceiver, a first radio resource control (RRC) connection request associated with the first RA request. The processor and the memory are also configured to cause the BS to send a first UE context request to the core network, the first UE context request including a first UE identifier (UEID) generated based on the first connection request. The processor and the memory are also configured to cause the BS to receive capability information for the UE from the core network. The processor and the memory are also configured to cause the BS to transmit, via the transceiver, first RRC configuration information to the UE originating the first RA request using a signaling radio bearer (SRB) configured according to the capability information.

In another aspect a wireless communication device operable as a UE includes a processor memory coupled to the processor; and a transceiver coupled to the processor. The processor and the memory are configured to cause the UE to receive truncation instructions; and transmit, via the transceiver to the BS, in a first connection request, a truncated identifier generated according to the truncation instructions and based on a UE identifier (UEID) of the UE. The processor and the memory are also configured to cause the UE to communicate with the BS via the transceiver using a communication configuration associated with a UE type indicated by the truncated identifier.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
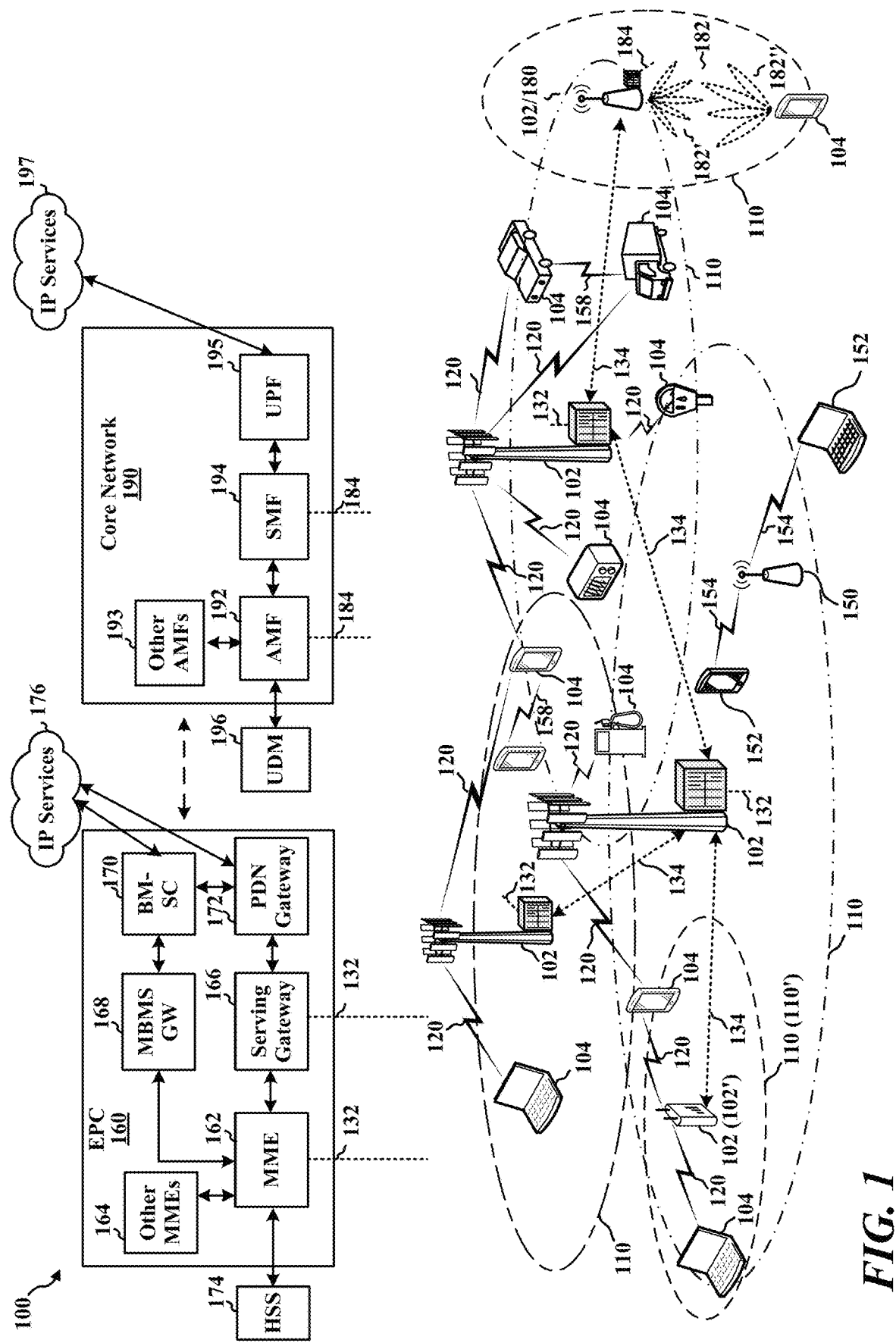
FIG. 1 shows a diagram illustrating an example wireless communications system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Implementations of the subject matter described in this disclosure may allow for the early retrieval of user equipment (UE) capabilities when a UE seeking to establish a connection with a radio access network is not able to provide an entirety of its UE identity in a single radio resource control (RRC) message. For example, many types of UEs may employ an RRC connection establishment procedure by sending an RRC connection request message that allows for a 40-bit UE identifier (UEID). UEs seeking to establish a connection with a 5G base station (such as an ng-eNB or gNB) and/or a 5G core network use a 48-bit 5G-S-TMSI to uniquely identify the UE and to uniquely identify the core network entity that stores the UE context. Due to the limited size of the RRC connection request message, these UEs typically transmit the 40 least significant bits (LSBs) of a certain identifier (i.e., a 5G shortened temporary mobile subscriber identity, 5G-S-TMSI) to the base station in an RRC connection request message, and then transmit the remaining 8 most significant bits (MSBs) of the 5G-S-TMSI to the base station in a subsequent RRC connection setup complete message.

However, the 8 MSBs of the 5G-S-TMSI correspond to 8 bits of a 10-bit access and mobility management function (AMF) set ID, which is necessary for the base station to determine which AMF within a particular AMF region stores the UE's context information. The UE context includes information such as the UE's capabilities, quality of service (QoS) information, and other parameters or characteristics of the UE (such as a supported maximum bandwidth, a transport block size (TBS), support for low power operation, and other radio optimization feature). As a result of the size limitation of the RRC connection request message, the base station may not be able to identify the correct AMF and retrieve the UE context until after reception of the RRC connection setup complete message, carrying the remaining 8 bits of the UEID. Base stations using the existing RRC connection establishment procedure provide various UE configurations (such as the signaling radio bearer (SRB) configuration) to the UE in an RRC connection setup message, which is transmitted to the UE before the base station receives the RRC connection setup complete message containing the remaining 8 bits of the 5G-S-TMSI. As such, base stations typically select or determine various UE configurations before retrieving the UE capabilities from the core network, which limits the ability of the base stations to individually tailor or optimize the various UE configurations for a particular UE.

This may be particularly problematic for some types of UEs, such as bandwidth-reduced low complexity (BL) UEs, that have limited capabilities (sometimes referred to as reduced capability UEs or "RedCap" UEs). For example, some UEs may support low power operation, such as the 14 dBm power class, that requires higher physical random access channel (PRACH) coverage enhancement (CE) levels to improve coverage for UE (such as UE located at the edge of a base station's coverage area). As such, the base station may need to know whether a particular UE supports low power operation (such as powerClass-14 dBm-r15) to efficiently allocate UL and DL resources to the UE. Thus, it would be desirable for a base station to obtain the UE capabilities of such devices before selecting and transmitting UE configurations to the UE in the RRC connection setup message Particular examples of BL UEs may include so-called "category M" or "Cat M" UEs, which are so-called because they are configured to perform according to one or more LTE-M performance levels defined by relevant releases of the 3GPP Technical Specifications (the 3GPP TS). For the 3GPP TS defines radio networks and related device categories for enhanced machine type communication (eMTC). Release 13 of the 3GPP TS defines the LTE Cat M1 performance level and release 14 defines the LTE Cat M2 performance level. Devices configured for these service levels are typically single-antenna devices and support peak downlink data rates of 1 Mbps for Cat M1 and ~4 Mbps for Cat M2. Cat M1 devices are expected to support peak uplink data rates of 1 Mbps while Cat M2 devices are expected to support peak uplink data rates of ~7 Mbps.

In some implementations of certain aspects of this disclosure, a UE may truncate or remove a number of bits from its UE identity based on identity truncating information to generate a truncated UE identity. The truncated UE identity is of a size that can be transmitted to a base station as the payload of an RRC connection request, and can be used by the base station to determine which core network entity (such as an AMF) stores the UE's capabilities. In some aspects, the UE may truncate or remove a number of bits from its 48-bit 5G-S-TMSI based on the identity truncating information to generate a 40-bit truncated 5G-S-TMSI that can be transmitted to the base station in the RRC connection request, and yet still provide the base station with enough information to determine which AMF stores the UE context. The base station may use the received truncated 5G-S-TMSI to retrieve the UE capabilities from the AMF before selecting or determining a number of UE configurations (such as the SRB configuration) for the UE. In this manner, the base station can select or determine an SRB configuration for UEs based on their respective capabilities, even when UEs do not transmit the entire 48-bit 5G-S-TMSI to the base station in an RRC connection request message.

In some other implementations, BL UEs may be configured to provide the truncated 5G-S-TMSI as the initial UE identity as a payload of the RRC connection request message, and ordinary UEs (e.g., non-BL UEs) may be configured to provide a first portion of the 5G-S-TMSI in the RRC connection request message and provide a second portion of the 5G-S-TMSI in the RRC connection setup complete message. In some aspects, ordinary UEs operating in a normal coverage mode may provide the 40 LSBs of a 5G-S-TMSI as the initial UE identity in an RRC connection request message, and ordinary UEs operating in an enhanced coverage mode (CE UEs) may provide the 39 LSBs of a 5G-S-TMSI and a 1-bit UE type as the initial UE identity the RRC connection request message ("Msg3"). In this way, the base station may determine a category and mode of the UE upon reception of the RRC connection request message, and may select or determine one or more UE configurations based on the determined category and mode of the UE. For example, the base station may determine that the UE is a BL UE when the initial UE identity includes the truncated 5G-S-TMSI, may determine that the UE is an ordinary UE when the initial UE identity includes the 40 LSBs of a 5G-S-TMSI, and may determine that the UE is a CE UE when the initial UE identity includes the 39 LSBs of a 5G-S-TMSI plus the 1-bit UE type.

In some other implementations, an ordinary UE may transmit a random access preamble using random access channel (RACH) resources having a first configuration, while a BL UE and/or CE UE may transmit a random access preamble using RACH resources having a second configuration that is different than the first configuration. In this way, a base station may determine whether a UE is an ordinary UE or is one of a BL UE or a CE UE upon reception of a PRACH preamble, thereby allowing the base station additional time to select or determine one or more UE configurations based on the category or mode of the UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may be a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 via S1 interfaces, and the base stations 102 configured for 5G NR may interface with the core network 190 through backhaul links 184 via N2 and N3 interfaces. The base stations 102 may communicate with one another through one or more backhaul links 134 via X2 interfaces. The base stations 102 may perform a number of functions including (but not limited to) the transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 404 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

The wireless communications system may further include a Wi-Fi access point (AP) 150 in communication with Wi-Fi stations (STAs) 152 via communication links 154 in a 2.4 GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

A given base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some UEs 104 may be referred to as IoT devices (such as a parking meter, gas pump, toaster, vehicles, heart monitor, etc.). Other UEs 104 may be referred to as cellular IoT (CIoT) devices (such as a smartphone capable of narrowband communications based on one or more designed for IoT devices). A UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A base station 102, whether a small cell 102' or a large cell (such as a macro base station), may include an eNB, an ng-eNB, gNodeB (gNB), or another type of base station. Some base stations, such as gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW or near mmW radio frequency band (such as between 3 GHz-300 GHz) has extremely high path loss and a short range. The mmW base station 180 may utilize beamforming 182 with the UE 104 to compensate for the extremely high path loss and short range. Beamforming, which may also be referred to as spatial filtering, directional transmission, or directional reception, is a signal processing technique that may be used at a transmitting device or a receiving device (such as a base station 102 or a UE 104) to shape or steer an antenna beam along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

For example, the base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The base stations 102 and the UEs 104 may wirelessly communicate with each other via one or more communication links 120 using one or more carriers. The term "carrier" may refer to a set of radio frequency spectrum resources having a defined physical layer structure for supporting the communication links 120. For example, a carrier used for a communication link 120 may include a portion of a radio frequency spectrum band (such as a bandwidth part (BWP)) that is operated according to physical layer channels for a given radio access technology. Each physical layer channel may carry acquisition signaling (such as synchronization signals, system information), control signaling that coordinates operation for the carrier, user data, or other signaling. The wireless communications system 100 may support communications between the base station 102 and the UEs 104 using carrier aggregation or multi-carrier operation. Carrier aggregation may be used with both frequency division duplexing (FDD) and time division duplexing (TDD) component carriers. Allocation of carriers may be asymmetric with respect to the DL and UL channels, for example such that the UL and DL channels may include different numbers of carriers. The component carriers may include a primary component carrier and one or more secondary component carriers. A primary component carrier may be referred to as a primary cell (PCell), and a secondary component carrier may be referred to as a secondary cell (SCell).

In some examples, a carrier may support multiple cells, and different cells may be configured according to different protocol types (such as MTC, NB-IoT, enhanced mobile broadband (eMBB), or others) that may provide access for different types of devices.

The communication links 120 may include uplink (UL) transmissions from a UE 104 to a base station 102 or downlink (DL) transmissions from a base station 102 to a UE 104. The communication links 120 may use multiple-input and multiple-output (MIMO) antenna technology, for example, to provide spatial multiplexing, beamforming, or transmit diversity. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Y×X MHz (X component carriers) used for transmission in each direction. The carriers may or may not be adjacent to each other.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some UEs 104, such as MTC or IoT devices, may be low cost or low complexity devices and may provide for automated communication between machines (such as by using Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay such information to a central server or application program that makes use of the information or presents the information to humans interacting with the application program. Some UEs 104 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 104 and a base station 102 or EPC 160 supporting radio bearers for user plane data. At the Physical layer, transport channels may be mapped to physical channels.

The EPC 160 may provide user authentication, access authorization, tracking, Internet Protocol (IP) connectivity, and other access, routing, or mobility functions. In some implementations, the EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is a control plane entity that manages access and mobility, and may be in communication with a Home Subscriber Server (HSS) 174. The MME 162 may manage non-access stratum (NAS) functions such as mobility, authentication, and bearer management for UEs 104 served by base stations 104 associated with the EPC 160, and may process the signaling between the UEs 104 and the EPC 160. All user IP packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, one or more other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some instances, the 5G NR frame structure may be FDD in which, for a particular set of subcarriers (carrier system bandwidth), slots within the set of subcarriers are dedicated for either DL or UL transmissions. In some other instances, the 5G NR frame structure may be TDD in which, for a particular set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 milliseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length/duration are a function of the numerology. The subcarrier spacing may be equal to 2^μ*15 kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (p).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
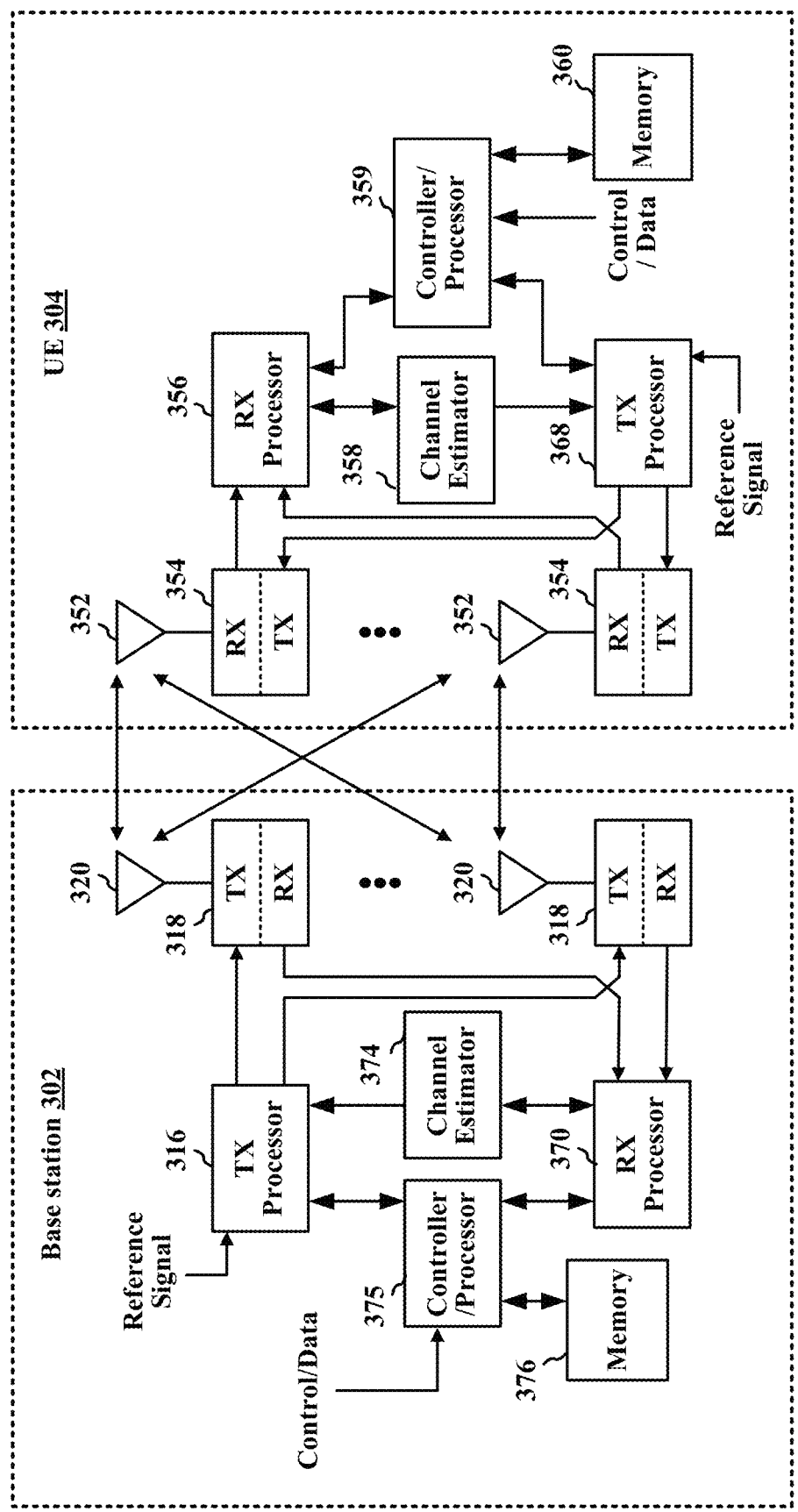
FIG. 3 shows a diagram illustrating an example base station and user equipment (UE) in an access network.

FIG. 3 shows a block diagram of an example base station 310 and UE 304 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams Channel estimates from a channel estimator 374 may be used to determine the coding and modulation scheme, as well as for spatial processing. The channel estimate may be derived from a reference signal or channel condition feedback transmitted by the UE 304. Each spatial stream may then be provided to a different antenna 320 via a separate transmitter 318TX. Each transmitter 318TX may modulate an RF carrier with a respective spatial stream for transmission.

At the UE 304, each receiver 354RX receives a signal through its respective antenna 352. Each receiver 354RX recovers information modulated onto an RF carrier and provides the information to the receive (RX) processor 356. The TX processor 3613nd the RX processor 356 implement layer 1 functionality associated with various signal processing functions. The RX processor 356 may perform spatial processing on the information to recover any spatial streams destined for the UE 304. If multiple spatial streams are destined for the UE 304, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 304. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 304. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 304 is coupled to a respective transmitter 354TX. However, in some other implementations, the UE 304 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

Figure 4:
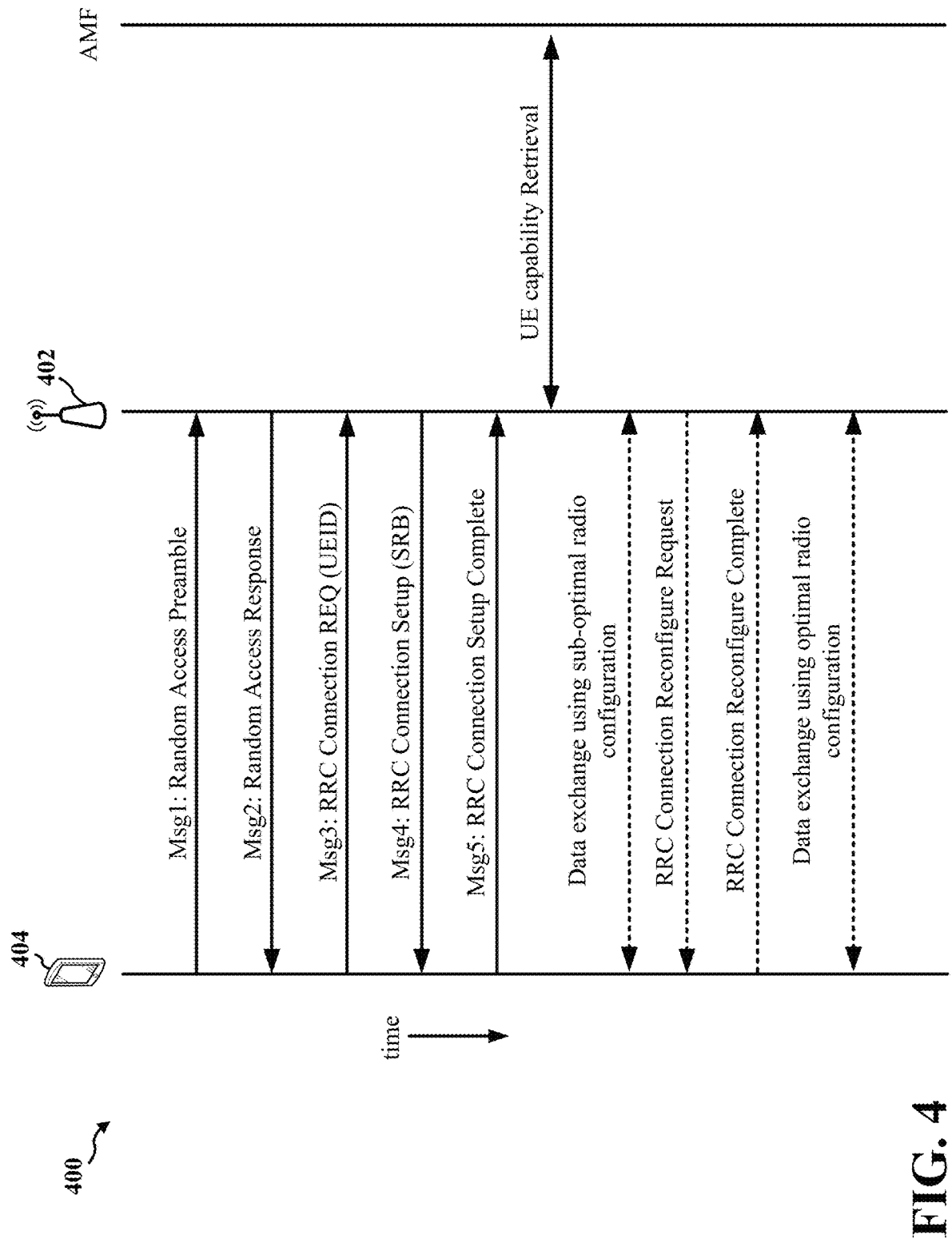
FIG. 4 shows a sequence diagram for wireless communication that supports an RRC connection procedure.

FIG. 4 shows a sequence diagram depicting an example message exchange 400 that supports establishing an RRC connection between a base station 402 and a UE 404. The base station 402 may be one example of the base station 102 of FIG. 1 or the base station 310 of FIG. 3, and the UE 404 may be one example of the UE 104 of FIG. 1 or the UE 304 of FIG. 3. The UE 404 may use a random access procedure to establish a layer-1 (physical layer) and layer-2 (MAC layer) connection with the base station 402, and then use an RRC procedure to establish a layer-3 connection (such as an RRC connection) with the base station 402.

The UE 404 may transmit a random access preamble (Msg1) to the base station 402 on a random access channel (RACH) of a radio access network. The random access preamble may be transmitted with a selected preamble sequence using a transmission power on an indicated RACH resource. The base station 402 receives the random access preamble in Msg1, and transmits a random access response ("Msg2") to the UE 404. When the random access response contains a random access preamble identifier that matches the preamble sequence of the random access preamble, the UE 404 may stop monitoring the RACH, and may initiate an RRC connection establishment procedure.

The UE 404 may transmit an RRC connection request (Msg3) to the base station 402. The RRC connection request may contain a UE identity (UEID) that uniquely identifies the UE 404. The UE identity may indicate a core network entity that stores the UE's context (such as the UE's capabilities and Inter-UE QoS information). In some instances, the UE identity may indicate a particular AMF (such as the AMF 192 of FIG. 1) that stores the UE's context, and can be used by the base station 402 to retrieve capability information of the UE 404 from the particular AMF.

The base station 402 receives Msg3, and may use the UE identity to identify the core network entity that stores the UE's context. The base station 402 may retrieve the UE's context from the identified core network entity, and may use the UE's radio capability information to determine an initial signaling radio bearer (SRB1) configuration for the UE 404.

The base station 402 may transmit the SRB1 configuration to the UE 404 in an RRC connection setup message ("Msg4"). The UE 404 receives Msg4, determines its SRB1 configuration, and transmits an RRC connection setup complete message ("Msg5") to the base station 402. Reception of Msg5 by the base station 402 may conclude the RRC connection establishment procedure.

In some instances, the number of bits available for transmitting UE identity information in a given RRC message may be less than the number of bits in the UE identity, and thus the UE may not be able to transmit the entire UE identity to the base station 402 in the RRC connection request (Msg3). For example, physical layer transport block size constraints may prevent eMTC devices from embedding more than 40 bits of an identifier in a given RRC message, and thus eMTC devices may not be able to transmit the entirety of a 48-bit UE identity to the base station 402 in the RRC connection request (Msg3).

An RRC connection request for a base station associated with a 5G core network typically includes a 48-bit 5G-S-TMSI as the UE identity. The 5G-S-TMSI includes a 10-bit AMF Set ID, a 6-bit AMF pointer, and a 32-bit 5G-TMSI. UEs such as eMTC devices that are not capable of sending the entire 48-bit 5G-S-TMSI in a given RRC message typically send the 40 least significant bits (LSBs) of the 5G-S-TMSI in the RRC connection request (Msg3), and then send the remaining 48 bits of the 5G-S-TMSI to the base station 402 in the RRC connection setup complete message (Msg5). However, the 8 most significant bits (MSBs) of the 5G-S-TMSI correspond to the 14it AMF set ID, which is necessary for the base station 402 to determine which AMF stores the UE context. As a result, the base station 402 may not be able to identify the AMF and retrieve the UE capabilities until reception of Msg5, and therefore typically configures SRB1 for the UE 404 before determining the UE's capabilities.

Selecting a SRB1 configuration without knowing the UE's capabilities may limit the base station's ability to tailor or optimize the SRB1 configuration for a UE. This may be particularly problematic for cellular IoT (CIoT) devices (such as eMTC or NB-IoT devices), using control plane optimization for small data transmission, having various capabilities for different radio enhancements. Thus, it is desirable for the base station 402 to obtain the UE radio capabilities of such devices before selecting and transmitting the SRB1 configuration in the RRC connection setup message (Msg4).

As pictured in FIG. 4, conventional BS systems and methods that retrieve UE capabilities after Msg5 may result in a BS communicating with a reduced capability ("Red-Cap") UE using a suboptimal radio configuration (i.e., over an SRB configured before the UE capabilities are retrieved by the BS). For instance, the BS may request UE transmit using power level it does not support and BS may not be able to receive UE transmissions. As a result, additional communications may be required in order to reconfigure the connection to match the UE's capabilities.

In accordance with various aspects of the present disclosure, a UE may modify its identify information. In some scenarios, a UE may modify its identity information by adjusting a size or number of bits of the identify information.

In some particular deployments, UEs may truncate or remove a number of bits from its UE identity. Such modifications, in some aspects, may be performed using identity truncation instructions or other suitable information to generate a truncated UE identity. In some scenarios, additional or alternative modifications may occur (e.g., expansion, bit substitution, bit place change, etc.).

Communication of modified identity information may occur in various manners. In some examples, a truncated UE identity can be transmitted by eMTC devices to a base station in an RRC connection request, and can be used by the base station to determine which core network entity (such as an AMF) stores the UE's capabilities. In some implementations, the UE may truncate or remove a number of bits from the 48-bit 5G-S-TMSI based on the identity truncating information to generate a 40-bit truncated 5G-S-TMSI that can be transmitted by an eMTC device to the base station in the RRC connection request and yet still provide the base station with enough information to determine which AMF stores the UE context. This allows the base station to retrieve the UE capabilities from the AMF before selecting the SRB configuration for the UE. In this manner, the base station can select or determine the SRB configuration for UEs based on their capabilities, even for UEs such as eMTC devices that may not be capable of transmitting the 48-bit 5G-S-TMSI in an RRC message.

Figure 5:
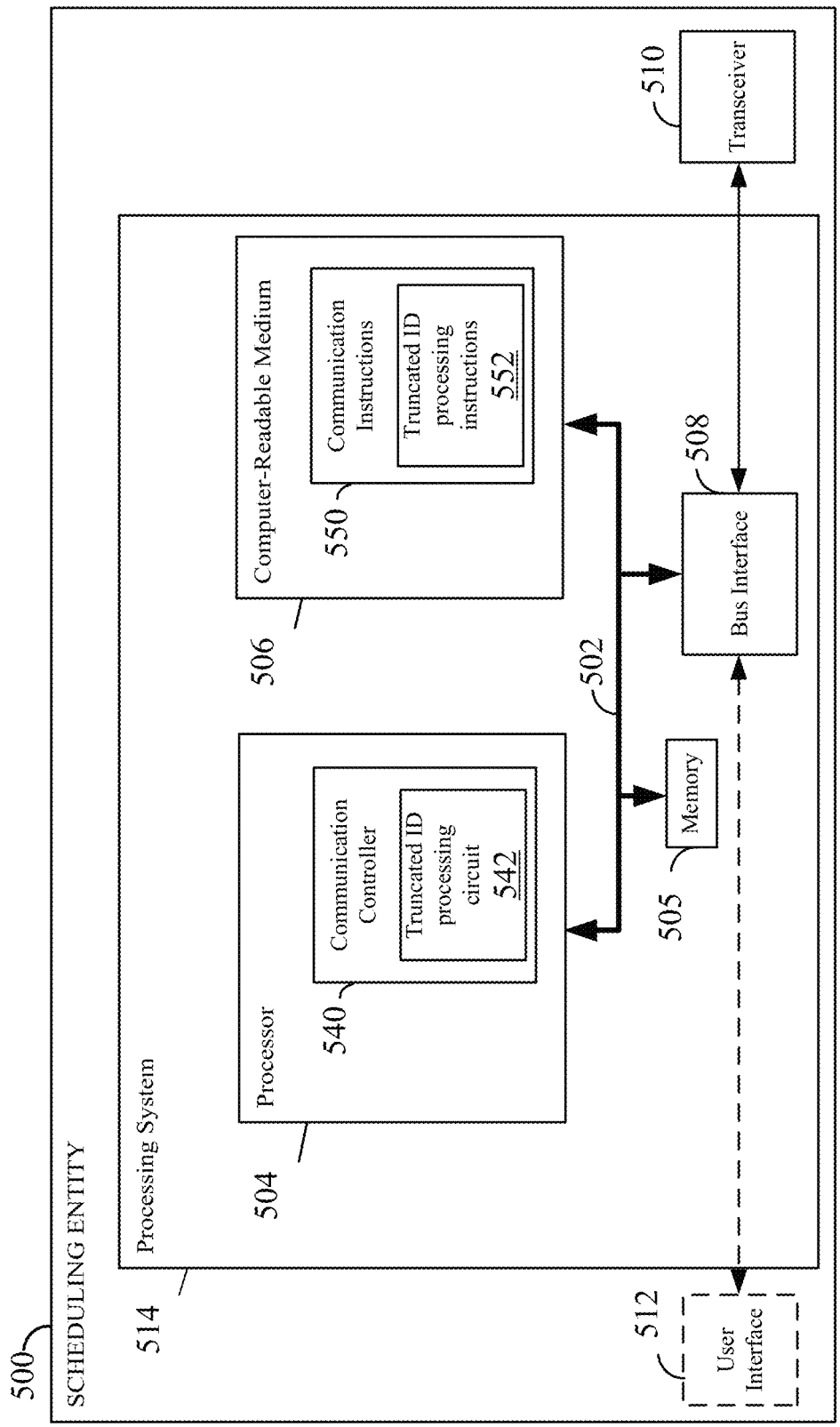
FIG. 5 is a block level schematic diagram of a scheduling entity.

FIG. 5 is a block diagram illustrating an example of a hardware implementation for a scheduling entity 500 employing a processing system 514. For example, the scheduling entity 500 may be user equipment (a UE) as illustrated in any one or more of FIGS. 1, 3, and 4. In another example, the scheduling entity 500 may be a base station as illustrated in any one or more of FIGS. 1, 3, and/or 4.

The scheduling entity 500 may include a processing system 514 having one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be configured (e.g., in coordination with the memory 505) to implement any one or more of the processes and procedures described below and illustrated, e.g., in FIG. 8, FIG. 9, FIG. 16, FIGS. 17A-17B, FIGS. 18A-18C, FIGS. 19A-19B, FIGS. 20A-20B or FIGS. 21A-21B, The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and some examples, such as a base station, may omit it.

In some aspects of the disclosure, the processor 504 may include a communication controller 540 which includes (or is otherwise coupled to) UE type determination circuitry 542 (e.g., in coordination with the memory 505) for various functions, including, e.g., signaling multi-panel configuration information with UEs or other devices, and communicating with those devices accordingly. For example, the multi-panel scheduling controller 542 may be configured respond to tracking area update requests from UEs, retrieve UE capability information, allocate uplink resources that appropriate for the capabilities of UEs, and schedule PUCCH and PUSCH transmissions over the allocated resources.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable medium 506 may store computer-executable code that includes communication instructions 550 (which include UE type determination instructions 552) that configure a scheduling entity 500 for various functions, including, e.g., requesting information concerning UE capabilities and scheduling transmissions over physical resources that are allocated according to those capabilities. For example, the multi-panel scheduling instructions 552 may be configured to cause a scheduling entity 500 to determine that a UE is a BL UE that is expected to transmit a truncated identity as described in below in connection with FIG. 7.

Figure 6:
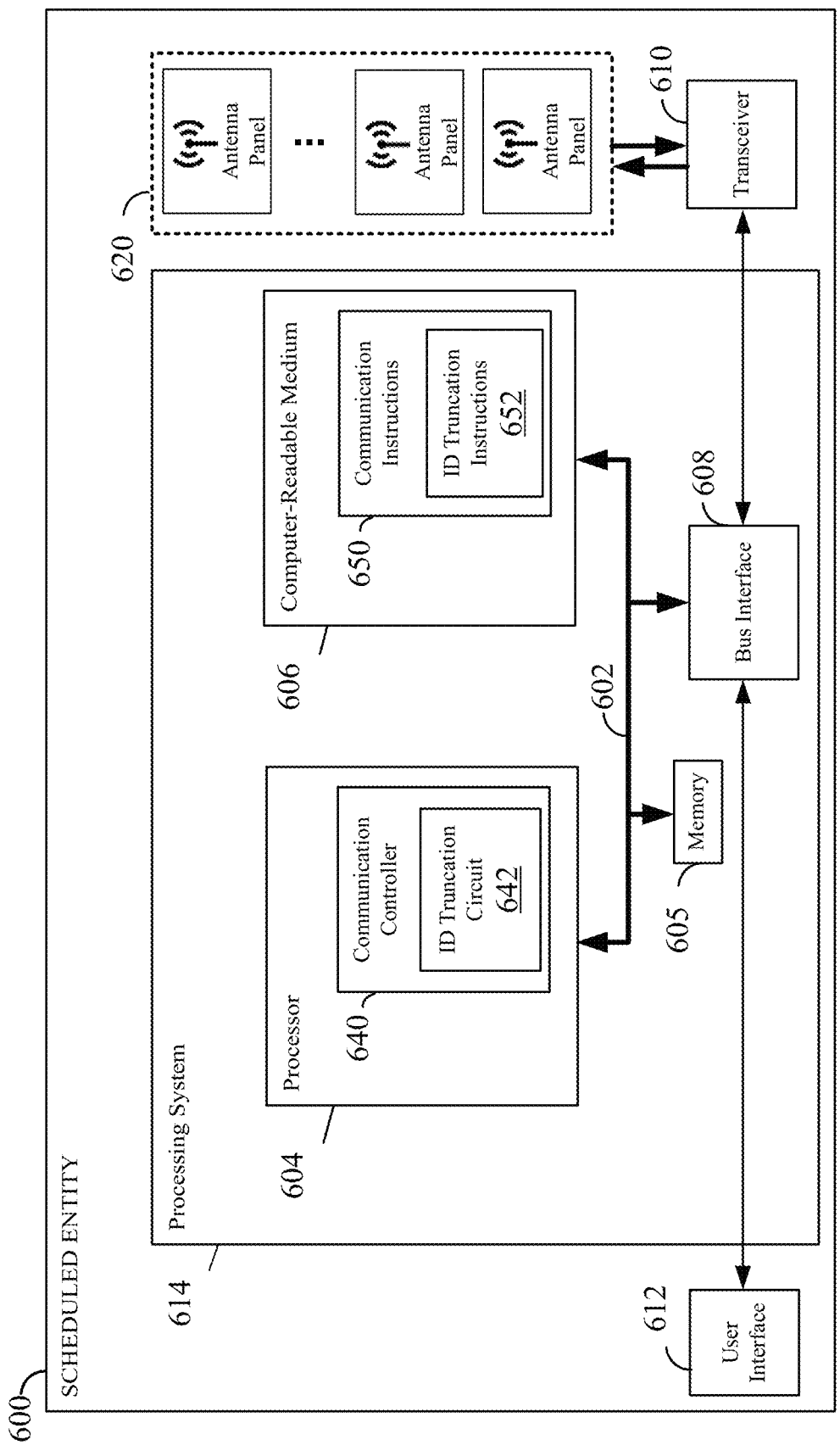
FIG. 6 is a block level schematic diagram of a scheduled entity.

FIG. 6 is a conceptual diagram illustrating an example of a hardware implementation for an example scheduled entity 600 employing a processing system 614. In accordance with various aspects of the disclosure, a processing system 614 may include an element, or any portion of an element, or any combination of elements having one or more processors 604. For example, the scheduled entity 600 may be a user equipment (UE) as illustrated in any one or more of FIGS. 1, 3, and/or 4.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 6. That is, the processor 604, as utilized in a scheduled entity 600, may be configured (e.g., in coordination with the memory 605) to implement any one or more of the processes described below and illustrated, e.g., in FIG. 10, FIG. 21C, FIGS. 22A-22B, or FIGS. 23A-23D.

The transceiver 610 may be coupled to two or more antenna panels 620 that are usable for transmission and reception of wireless signals. Each antenna panel 620 may be an individual directional antenna that is either physically or electrically steerable (e.g., an electrically steerable phased array). In some examples, one or more antenna panels 620 may be "virtual antennas" formed by dynamically addressing individual receiver elements in a reconfigurable array and operating those receiver elements as a phased array having characteristics desired for a particular application or desired at a particular point in time.

In some aspects of the disclosure, the processor 604 may include a communication controller 640 including UE identification circuitry 642 configured (e.g., in coordination with the memory 605) for various functions, including, for example, generating a truncated UEID as described below in connection with FIG. 7. For instance, the communication controller 640 may be configured to generate a truncated UEID that allows for early identification of the UE by a BS.

And further, the computer-readable storage medium 606 may store computer-executable code that includes communication instructions 650 that include UE identification instructions 652 that configure a scheduled entity 600 for various functions, including, for example, generating a truncated UEID as described below in connection with FIG. 7. For instance, the communication instructions 650 may be configured to cause the scheduled entity 600 to generate a truncated UEID that allows for early identification of the UE by a BS.

Figure 2:
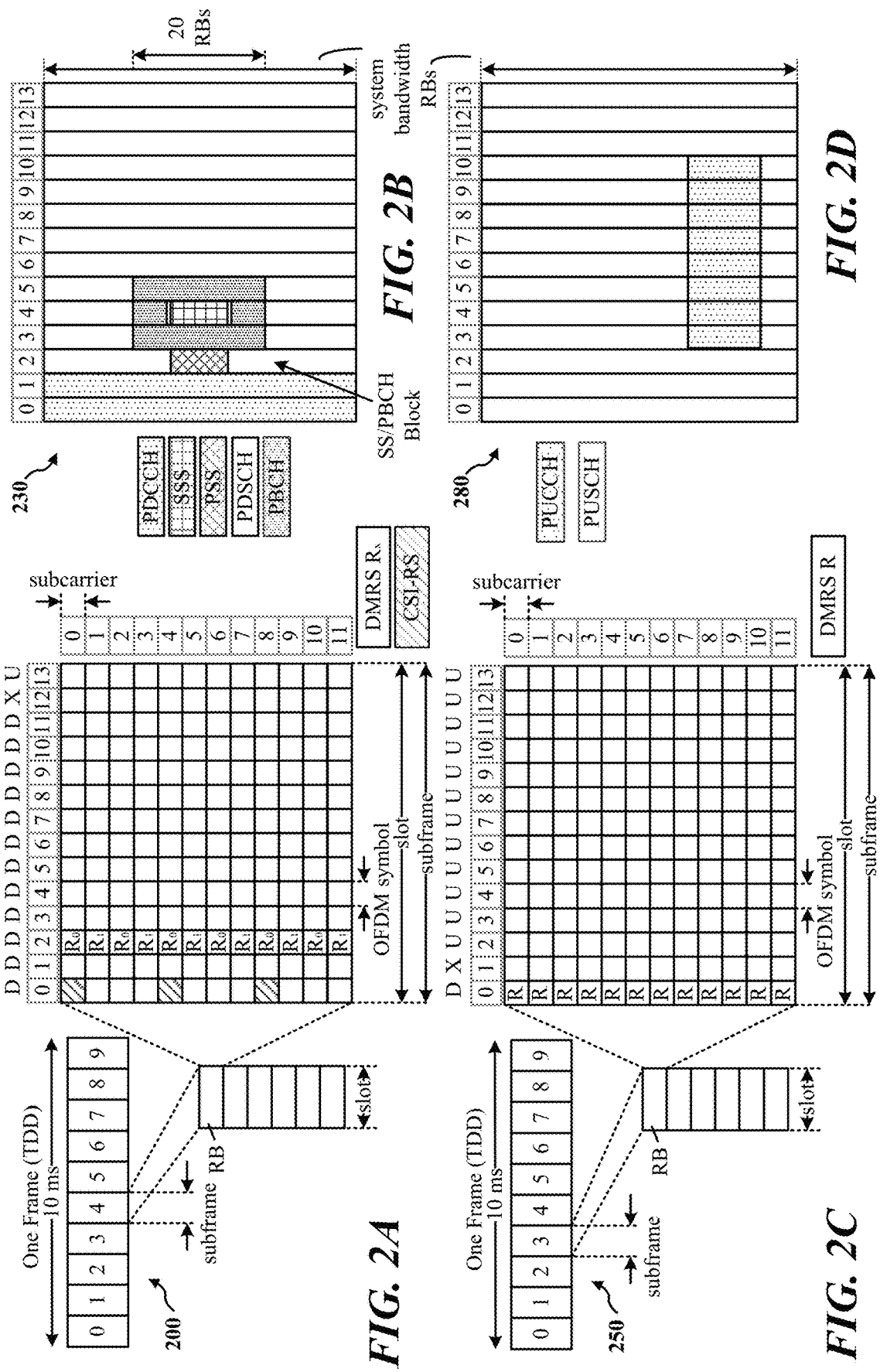
FIG. 2A shows an example of a first 5G NR frame.
FIG. 2B shows example downlink (DL) channels within a 5G NR slot.
FIG. 2C shows an example of a second 5G NR frame.
FIG. 2D shows example uplink (UL) channels within a 5G NR slot.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, and/or 3, and utilizing, for example, the processes and/or algorithms described herein in relation to in FIG. 10, FIG. 21C, FIGS. 22A-22B, or FIGS. 23A-23D.

Figure 7:
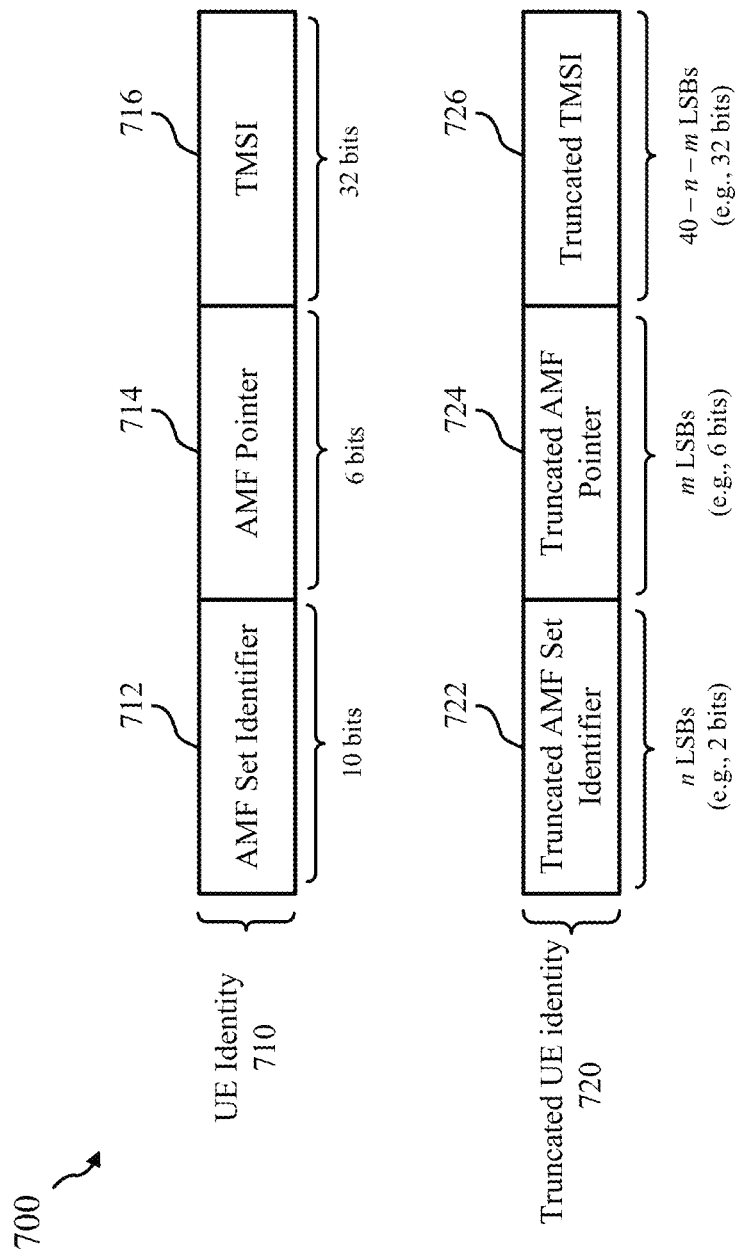
FIG. 7 shows example fields of a UE identity and truncated UE identity.

FIG. 7 shows an example UE identity 710 and an example truncated UE identity 720. The UE identity 710, which in some instances may be a 48-bit 5G-S-TMSI, includes an AMF set identifier 712, an AMF pointer 714, and a TMSI 716. The AMF set identifier 712 may uniquely identify an AMF set within an AMF region, the AMF pointer 714 may identify one or more AMFs within the AMF set, and the TMSI 716 may uniquely identify a particular UE. The truncated UE identity 720, which includes a truncated AMF set identifier 722, a truncated AMF pointer 724, and a truncated TMSI 726, may be generated by removing a number of bits from one or more of the AMF set identifier 712, the AMF pointer 714, or the TMSI 716 of the UE identity 710 based on the identity truncating information.

In some network implementations, there may be a fewer number of AMF sets within a given AMF region that can be uniquely identified by the AMF set identifier 712, and therefore one or more MSBs of the AMF set identifier 712 may be the same for a plurality of different AMF sets. Similarly, there may be a fewer number of AMFs within a given AMF set that can be uniquely identified by the AMF pointer 714, and therefore one or more MSBs of the AMF pointer 714 may be the same for a plurality of different AMFs. In other words, the number of MSBs of the AMF set identifier 712 that are common to all AMF sets within a given AMF region are not used to uniquely identify the AMF sets within the given AMF region, and therefore may be removed or truncated from the UE identity 710 to generate the truncated UE identity 720. Similarly, the number of MSBs of the AMF pointer 714 that are common to all AMFs within a given AMF set are not used to uniquely identify the AMFs within the given AMF set, and therefore may be removed or truncated from the UE identity 710 to generate the truncated UE identity 720.

The number of LSBs of the AMF set identifier 712 that are not common to the AMF sets within a given AMF region may uniquely identify the AMF sets, and therefore may be retained when generating the truncated UE identity 720. Similarly, the number of LSBs of the AMF pointer 714 that are not common to the AMFs within a given AMF set may uniquely identify the AMFs within the given AMF set, and therefore may be retained when generating the truncated UE identity 720. In some implementations, the identity truncating information may indicate a first number n of LSBs of the AMF set identifier 712 to be retained when generating the truncated UE identity 720, and indicate a second number m of LSBs of the AMF pointer 714 to be retained when generating the truncated UE identity 720. In some aspects, the truncated AMF set identifier 722 may be generated by retaining the n LSBs of the AMF set identifier 712 (and removing the remaining MSBs of the AMF set identifier 712), and the truncated AMF pointer 724 may be generated by retaining the m LSBs of the AMF pointer 714 (and removing the remaining MSBs of the AMF pointer 714).

In some implementations, the first and second numbers n and m may also be used to determine the number M of LSBs of the TMSI 716 to be retained when generating the truncated UE identity 720. The number M may be expressed as M=N−n−m, where N is the number of bits in the truncated UE identity 720. In some aspects, the truncated TMSI 726 may be generated by retaining only the (N−n−m) LSBs of the TMSI 716. For example, in instances for which the truncated UE identity 720 contains 40 bits, the number of common MSBs of the AMF set identifier 712 is 6 bits, and the number of common MSBs of the AMF pointer 714 is 4 bits, the truncated AMF set identifier 722 may be generated by retaining only the n=2 LSBs of the AMF set identifier 712, the truncated AMF pointer 724 may be generated by retaining only the m=6 LSBs of the AMF pointer 714. Thus the truncated TMSI 726 may be generated by retaining only the (40−2−6) LSBs of the TMSI 716 (i.e., the 32 LSBs of the TMSI 716 in this example). In some other implementations, the identity truncating information may expressly indicate the number of LSBs of the TMSI 716 to retain when generating the truncated UE identity 720. For example, the identity truncating information may also include a value z indicating the number of LSBs of the TMSI 716 to retain when generating the truncated UE identity 720. It should be understand that although particular values are given for n and m in this example, that any suitable values may be used in various applications.

Figure 8:
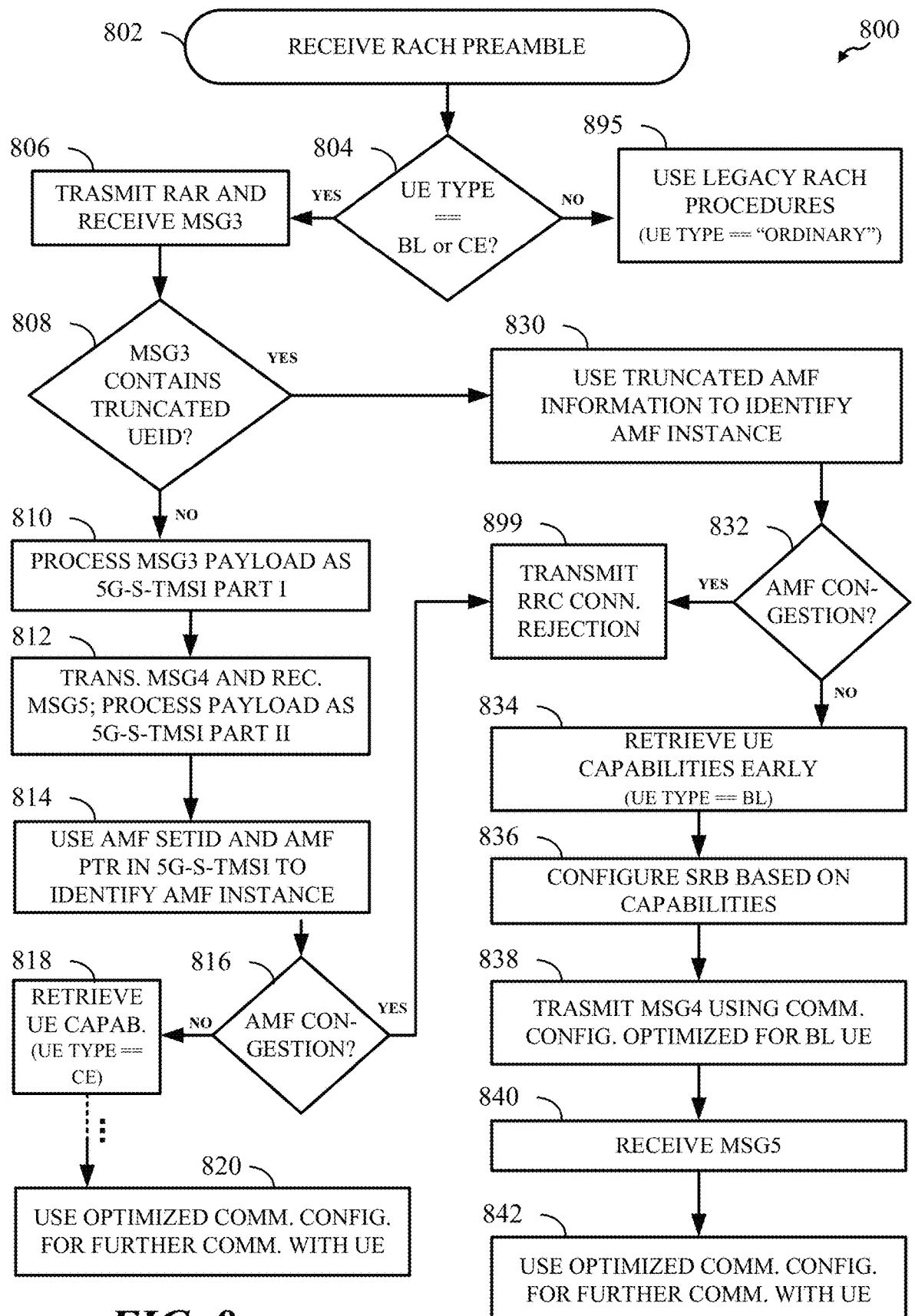
FIG. 8 is flow diagram illustrating communication sequences for different UEs in communication with a base station in some aspects.

FIG. 8 is a flow diagram illustrating an example communication sequence 800 between a BS (e.g., one or more of a BS 102, 302, 402, a scheduling entity 500, and/or a BS 1302, 1402, 1502) and a UE (e.g., one or more of a UE 104, 304, 404, a scheduled entity 600, and/or a UE 1304, 1404, 1504) that depends upon a type of the UE (e.g., whether UE is configured to operate as category M or other BL UE, as a non-BL CE UE, or as an "ordinary" UE, and/or whether the UE is configured to signal that it is operating as one of those UE types).

The sequence 800 begins at block 802. At block 802 the BS receives a random-access preamble from a UE and proceeds to block 804. In this example, the UE may be classified as one of three types: a BL UE, a non-BL CE UE, or an ordinary UE that is not operating as a BL UE or as non-BL UE in an enhanced coverage (CE) configuration). In some examples, the BS can make a preliminary determination that the UE is using a legacy configuration based on the physical resources over which the preamble is received (e.g., legacy, or "ordinary" UEs may use a first range of resources, while BL UEs and CE UEs may use a different range of resources). If the UE is an ordinary UE, the sequence proceeds to block 895 and the BS communicates with the UE using legacy RACH procedures. If the UE is not an ordinary UE (or not operating as one), the sequence 800 proceeds to block 806.

At block 806, the BS transmits a random access response (i.e., an RAR, or Msg2) to the UE, and receives an RRC connection request (Msg3) from the UE. At block 808, the BS can determine whether the UE is a BL UE or a CE UE using a UE ID that forms contents of the RRC connection request. For instance, if the UEID is a valid 40-bit truncated UEID (e.g., the truncated UEID 720) as described above, the BS can determine that the UE is a BL UE and proceed to blocks 830-842 instead of blocks 810-820 which have certain similarities to the legacy procedures of block 895.

At block 810, because the UE is determined to be a CE UE (or at least neither a legacy UE nor a BL UE), the BS treats the contents of the RRC connection request as a first part of a 48-bit 5G-S-TMSI (e.g., a number of) and proceeds to block 812.

At block 812, the BS transmits (e.g., via a transceiver) a contention resolution message (Msg4) to the UE and receives acknowledgement of the uplink grant from the UE (Msg5) which includes the remaining bits of the 5G-S-TMSI for the UE. At this point the BS has all the information required to identify an AMF instance to contact to ensure that the network has capacity to accommodate the UE.

At block 814, the BS identifies the correct AMF instance to determine whether the network can accommodate the UE and proceeds to block 816.

At block 816, the BS receives a response. If the network is congested the BS may proceed to block 899. Otherwise, the BS may proceed to block 818.

At block 818, the BS retrieves capability information for the UE from the AMF instance identified using the full 48-bit TMSI and proceeds to block 820.

At block 820, the BS and UE communicate using mutual signaling configurations optimized for the capabilities of the UE.

If the UEID received at block 808 was a valid truncated TMSI, the sequence proceeds to blocks 830-842. At block 830, the BS can use the truncated AMF information (e.g., the truncated AMF set identifier 722 and the truncated AMF pointer 724) to identify and contact the AMF instance from which the UE capabilities can be retrieved. The BS contacts the AMF instance to determine whether the network can accommodate the UE and proceeds to block 832

At block 832, the BS receives a response. If the network is congested the BS may proceed to block 899. Otherwise, the BS may proceed to block 834. Notably, because a complete (truncated) UEID is received at block 808 when the UE is a BL UE, the BS can determine the network conditions and request UE capability information immediately after receiving the RRC connection request (as opposed to only being able to do so after receiving Msg5 when the UE is not a BL UE using a 40-bit truncated UEID).

At block 834, the BS retrieves the UE capabilities using the truncated identifier and proceeds to block 836. At block 836, the BS configures a signal radio bearer SRB and proceeds to block 838. At block 838, the BS transmits a uplink resource grant to the UE (Msg4). The grant is sent using resources that are already optimized for the BL UE's reduced capabilities At block 840, the BS receives an acknowledgment of the uplink resource grant from the UE (Msg5) and proceeds to block 842. At block 842, the UE and BS continue to communicate using signaling configurations that are optimized for the UE's capabilities.

Figure 9:
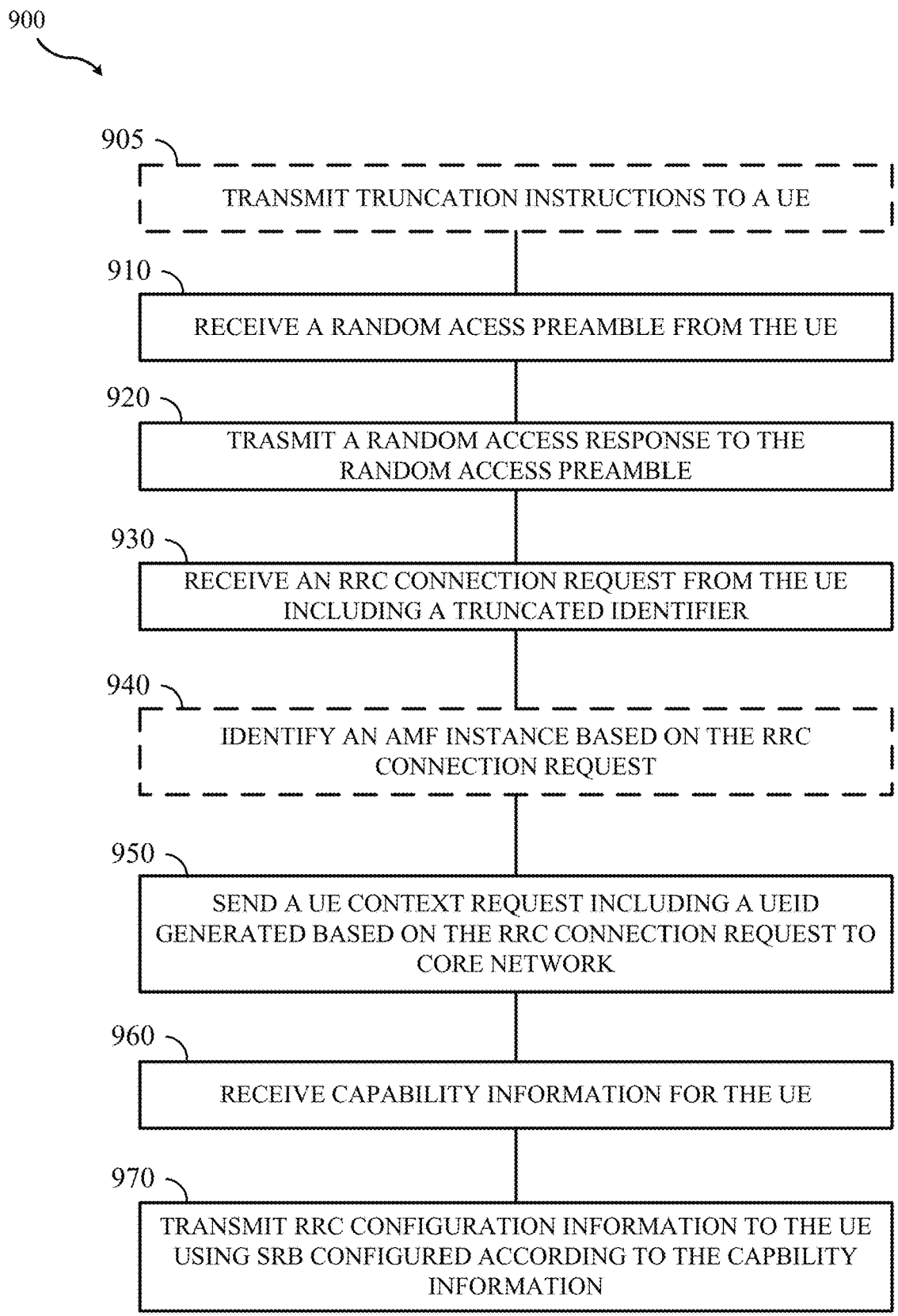
FIG. 9 is a flowchart illustrating an example method performed by a scheduling entity.

FIG. 9. and FIG. 10 described below, illustrate example processes 900, 1000 performed by a BS and UE, respectively that include the use of truncated identifiers according to aspects of the disclosure. It should be understood that these and other examples may refer to specific elements of 5G random-access communication protocols, but that discussion of these elements is for the purposes of illustration only and that, in some aspects, any suitable methods may be used to perform various steps. For instance, in examples herein, a UE may transmit a random access preamble (often referred to as Msg1) to request resources for wireless communication. Such a preamble is typically a sequence generated based on a cyclic shift applied to the Zadoff-Chu sequence of a desired cell. However, in some aspects, any suitable random access request message may be used. Similarly, in examples herein, a UE may communicate an identity or other identifier in a radio resource control (RRC) connection request (often referred to as Msg3). However, in some aspects, any suitable connection request message may be used.

In addition, examples below and other examples describe a UE transmitting information to a BS, and a BS receiving information from a UE, and the like. Unless explicitly required, such language is meant to include instances in which a BS and UE communicate directly and instances in which the communication may be indirect, such as when a signal from a UE to a BS is relayed by one or more intermediate networks or devices.

FIG. 9 is a flow chart illustrating an example process 900 for a BS to communicate with a UE transmitting a truncated identifier, in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity or UE 500 illustrated in FIG. 5. In some examples, the process 900 may be carried out by any suitable apparatus or means for carrying out the functions or algorithm described below.

In one example, the process 900 may be performed by a processor (e.g., the processor 504 of the scheduled entity 500) in communication with a transceiver (e.g., the transceiver 510), using type determination circuitry and a communication controller (e.g., the communication controller 540 including the truncated ID processing circuit 542) executing machine-readable instructions (e.g., the communication instructions 550 including the truncated ID processing instructions 552).

At block 905, the BS optionally transmits truncation instructions to a UE using the transceiver. For instance, the BS may transmit information indicating a number of bits of AMF information and other information (e.g., a partial UE identifier) to use to form a truncated identifier. As example, the UE may be configured to generate a 40-bit truncated identifier (e.g., the truncated UE identity 720) based on a 48-bit 5G-S-TMSI (e.g., the UE identity 710), where the truncated identifier contains n bits of an AMF set identifier, m bits of an AMF pointer, and (40−n−m) bits of a TMSI, as illustrated by FIG. 7.

In some aspects, the BS may transmit the truncation instructions in response to receiving an RRC connection request from an unregistered BL UE or an unregistered CE UE. For instance, the BS may receive an RRC connection request with a 40-bit payload that includes 39 random bits as the 39 MSBs along with an UE ID-type indicator value (e.g., a '0' in the LSB) indicating that the UE is either an unregistered BL UE or an unregistered non-BL CE UE transmitting a random 39-bit identifier. This is in contrast to a registered UE transmitting 39-bits of an identifier associated with the registered UE, followed by a complementary indicator value (e.g., a '1' in the LSB).

The BS may then transmit appropriate information (i.e., "truncation instructions") to the UE, such as values of the numbers {n, m} in the example above. In some aspects, the BS may transmit the truncation instructions in an NAS registration accept message. In some aspects, the BS may transmit the truncation instructions in a system information block.

At block 910, the BS receives a random access preamble from a UE (e.g., a UE such as the UE to which the truncation instructions were sent at block 905) using the transceiver.

At block 920, the BS uses the transceiver to transmit a random access response (RAR) to the UE.

At block 930, the BS uses the transceiver to receive an RRC connection request from the UE. This RRC connection request contains a truncated identifier generated according to the truncating instructions. In some aspects, the BS may be configured to handle RACH communications from at least three distinct UE types (or UEs that are configure to signal the BS in accordance with those types): BL UEs, non-BL CE UEs, and "ordinary" UEs (neither BL nor CE).

The BS may perform steps of the process 900 differently (or at different times), depending on the UE type indicated by the RRC connection request and/or the random access preamble. For instance, ordinary UEs may be configured to communicate over different RACH resources (e.g., frequency ranges) than BL or CE UEs. In some aspects, BL UEs may be configured to transmit a truncated identifier containing sufficient information to identify an AMF instance in the RRC connection request (Msg3) as described above in connection with FIG. 8. In some aspects, CE UEs may be configured to transmit a first portion of a 5G-S-TMSI and UEID type indicator value corresponding to a CE UE type in the RRC connection request, followed by a remaining portion of the 5G-S-TMSI in an RRC setup acknowledgement (Msg5) as described above in connection with FIG. 8.

At block 940, the BS may optionally identify an AMF instance based on the payload of the RRC connection request. If the UE is a BL UE or other UE transmitting a properly truncated identifier (e.g., the truncated UE identity 720), the BS may have sufficient information to identify the AMF instance before receiving the RRC setup acknowledgement (Msg5). This can enable the BS to retrieve capability information from the AMF instance earlier than in conventional systems and methods. As a result, the BS can transmit an uplink resource grant (i.e., Msg4) using a signaling radio bearer (SRB) that is already optimized for the UE's capabilities. This may prevent communicating with the UE using a sub-optimal radio configuration and may eliminate the need for one or more RRC configuration requests to be transmitted by the BS as described above in connection with FIG. 4 and FIG. 8).

At block 950, the BS may send a UE context request with a UE identity generated based on the RRC connection request to the core network via a backhaul channel using the transceiver or dedicated backhaul communication circuitry. As above, when the UE uses a truncated ID formatted according to aspects herein, the BS may send the context request immediately after receiving the RRC connection request with the truncated ID instead of waiting for a subsequent transmission from the UE.

At block 960, the BS receives the capability information for the UE from the core network (e.g., via the backhaul interface). The capability information allows the BS to configure the UE with radio configuration that is appropriate for the UE's capabilities.

At block 970, the BS transmits RRC configuration information to the UE via the transceiver using an SRB configured according to the UE's capabilities. When the UE transmits a proper truncated identifier, the BS can perform the actions of block 970 after receiving the truncated identifier in the RRC connection request received at block 930. Otherwise, as described in connection with FIG. 4, the BS may fail to successfully transmit the information or may transmit the information using a suboptimal radio configuration.

Figure 10:
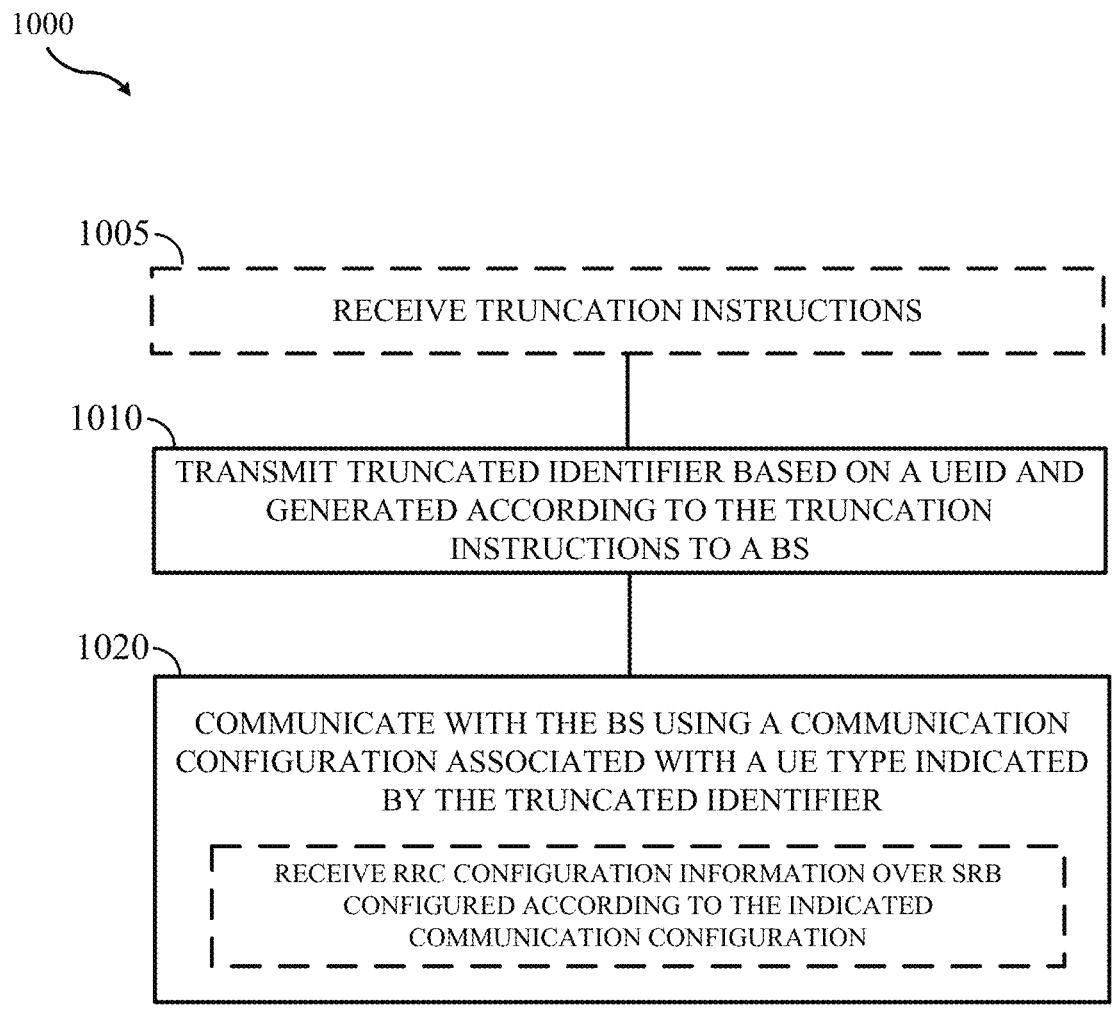
FIG. 10 is a flowchart illustrating an example method performed by a scheduled entity.

FIG. 10 is a flow chart illustrating an example process 1000 for a UE to transmit a truncated identifier allowing a BS to perform early retrieval of the UE's capabilities during random access communications in accordance with some aspects of the present disclosure. As described below, some or all illustrated features may be omitted in a particular implementation within the scope of the present disclosure, and some illustrated features may not be required for implementation of all embodiments. In some examples, the process 100 may be carried out by the scheduled entity or UE 600 illustrated in FIG. 6. In some examples, the process 1000 may be carried out by any suitable apparatus or means for carrying out the functions or algorithm described below.

In one example, the process 1000 may be performed by a processor (e.g., the processor 604 of the scheduled entity 600) in communication with a transceiver (e.g., the transceiver 610), using ID truncation circuitry and a communication controller (e.g., the communication controller 640 including the ID truncation circuit 642) executing machine-readable instructions (e.g., the communication instructions 650 including the ID truncation instructions 652).

At block 1005, the UE optionally receives truncation instructions (e.g., from a BS using the transceiver). For instance, the UE may receive information indicating a number of bits of AMF information and other information (e.g., a partial UE identifier) to use to form a truncated identifier. As example, the UE may be configured to generate a 40-bit truncated identifier (e.g., the truncated UE identity 720) based on a 48-bit 5G-S-TMSI (e.g., the UE identity 710), where the truncated identifier contains n bits of an AMF set identifier, m bits of an AMF pointer, and (40−n−m) bits of a TMSI, as illustrated by FIG. 7. In some aspects the UE may be preconfigured with the truncation instructions stored in memory (e.g., the memory 605) or to receive the instructions via a user interface (e.g., the user interface 612).

At block 1010, the UE uses the transceiver to transmit a truncated identifier generated based on a UE identity using the truncation instructions. In some aspects, the UE is a BL UE (or configured to signal the BS in a manner associated with a BL UE type) and transmits a truncated identifier such as the truncated identity 720 of FIG. 7. In other aspects, the UE is a non-BL CE UE (or configured to signal the BS in a manner associated with a CE UE type). In such aspects, a CE UE may be configured to transmit a first portion of a 5G-S-TMSI and UEID type indicator value corresponding to a CE UE type in an RRC connection request, followed by a remaining portion of the 5G-S-TMSI in an RRC setup acknowledgement (Msg5) as described above in connection with FIG. 8.

At block 1020, the UE uses the transceiver to communicate with the BS using a communication configuration associated with a UE type indicated by the truncated identifier. For instance, in some aspects, if the UE is BL UE (or configured to signal the BS in a manner associated with the BL UE type), the truncated identifier (e.g., the initial UE identity 1210 described further below in connection with FIG. 12) may indicate a BL UE type and may include sufficient information for the BS to perform "early" capability retrieval for the UE as described above. Meanwhile, in some aspects, if the UE is a CE UE (or configured to signal the BS in a manner associated with the CE UE type), the truncated identifier may contain 39 LSBs of a 5G-S-TMSI accompanied by an UEID type indicator value e indicating that the ID is a truncated ID corresponding to the CE UE type (e.g., the initial UE identity 1220 described further below in connection with FIG. 12).

According to some aspects, when the UE is a BL UE type, block 1020 optionally includes receiving RRC configuration information from the BS over an SRB configured according to the BL UE type indicated by the truncated identifier. BL UEs in such aspects may communicate more efficiently than in previous approaches for communication with reduced capability UEs. For instance, in conventional systems and methods described above in connection with FIG. 4, a BS may transmit an uplink resource grant or other information to the UE using a suboptimal radio configuration, resulting in errors or delays.

Figure 11:
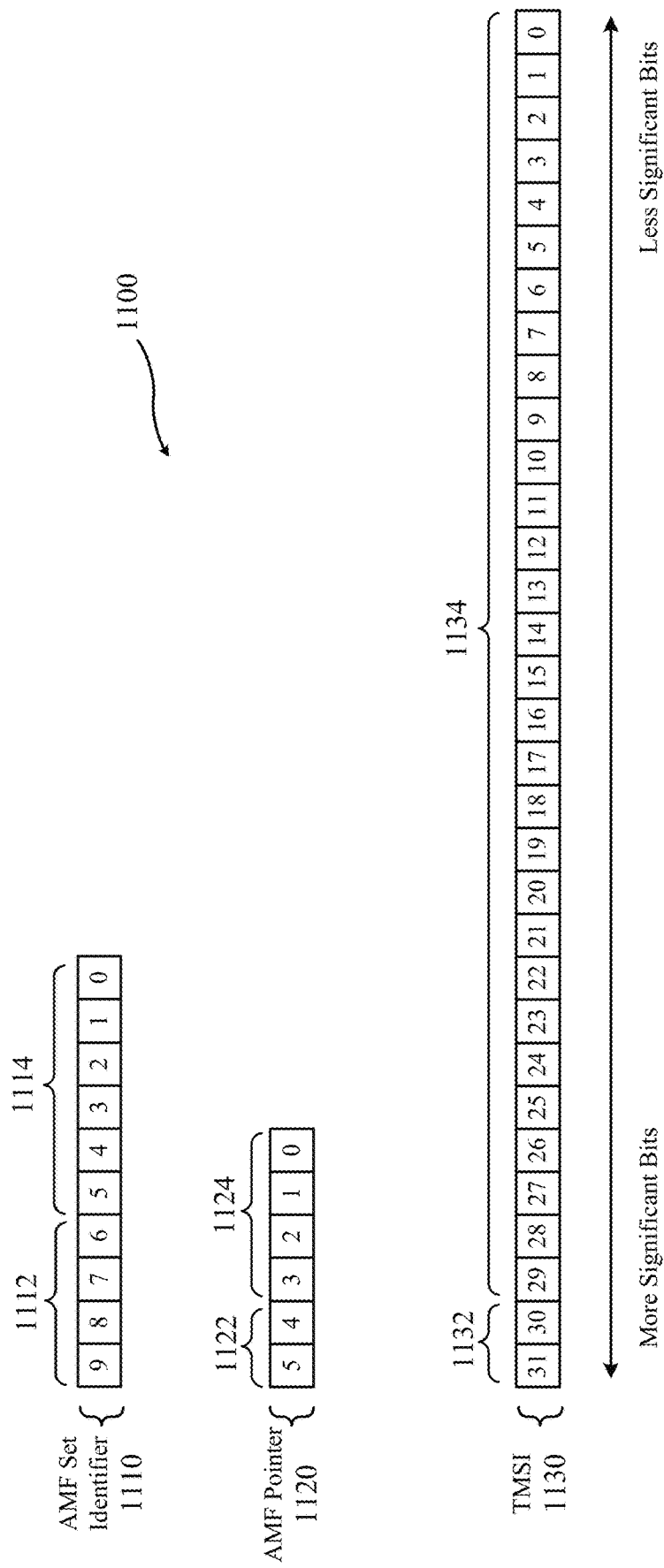
FIG. 11 depicts the generation of an example truncated UE identity.

FIG. 11 depicts the generation of an example truncated UE identity by truncating certain bits of a UE identity and retaining certain other bits of the UE identity. As shown, the UE identity includes a 10-bit AMF set identifier 1110, a 6-bit AMF pointer 1120, and a TMSI 1130. A truncated AMF set identifier may be generated by truncating a number or subset 1112 of MSBs of the AMF set identifier 1110, and thus retaining only a number or subset 1114 of LSBs of the AMF set identifier 1110. Similarly, a truncated AMF pointer may be generated by truncating a number or subset 1122 of MSBs of the AMF pointer 1120, and thus retaining only a number or subset 1124 of LSBs of the AMF pointer 1120. A truncated TMSI may be generated by truncating a number or subset 1132 of MSBs of the TMSI 1130, and thus retaining only a number or subset 1134 of LSBs of the TMSI 1130.

In some implementations, the value of n may be equal to or less than the total length of the AMF set identifier 1110, and the value of m may be equal to or less than the total length of the AMF pointer 1120. For example, n may be no larger than 10 and m may be no larger than 6. The total of n+m+z may be equivalent to the number of bits allocated for transmitting the identification indicator (e.g., 40 bits).

A UE may receive the identity truncating information, and may generate the truncated UE identity by removing a number of bits one or more fields of the UE identity according to the values contained in the identity truncating information. For the example of FIG. 11, the identity truncating information may indicate 2, 6, and 32 as the values of n, m, and z, respectively. For example, the UE may remove the 4 MSBs 1112 from the AMF set identifier 1110, may remove the 2 MSBs 1122 from the AMF pointer 1120, and may remove the 2 MSBs from the TMSI 1130 to generate the truncated UE identity.

In some implementations, a UE 1204 may be an enhanced machine type communications (eMTC) device capable of embedding no more than 40 bits of an identify in RRC messages, and the core network associated with the AMF 706 may be a 5G core network that uses the 48-bit 5G-S-TMSI to uniquely identify UEs and their corresponding AMFs. In some aspects, the UE 1204 may generate a 40-bit truncated UE identity from the 48-bit 5G-S-TMSI such that the truncated UE identity can be transmitted to a base station 1202 in a single RRC message and can be used by the base station to identify the AMF that store capability and other information of UE.

Figure 12:
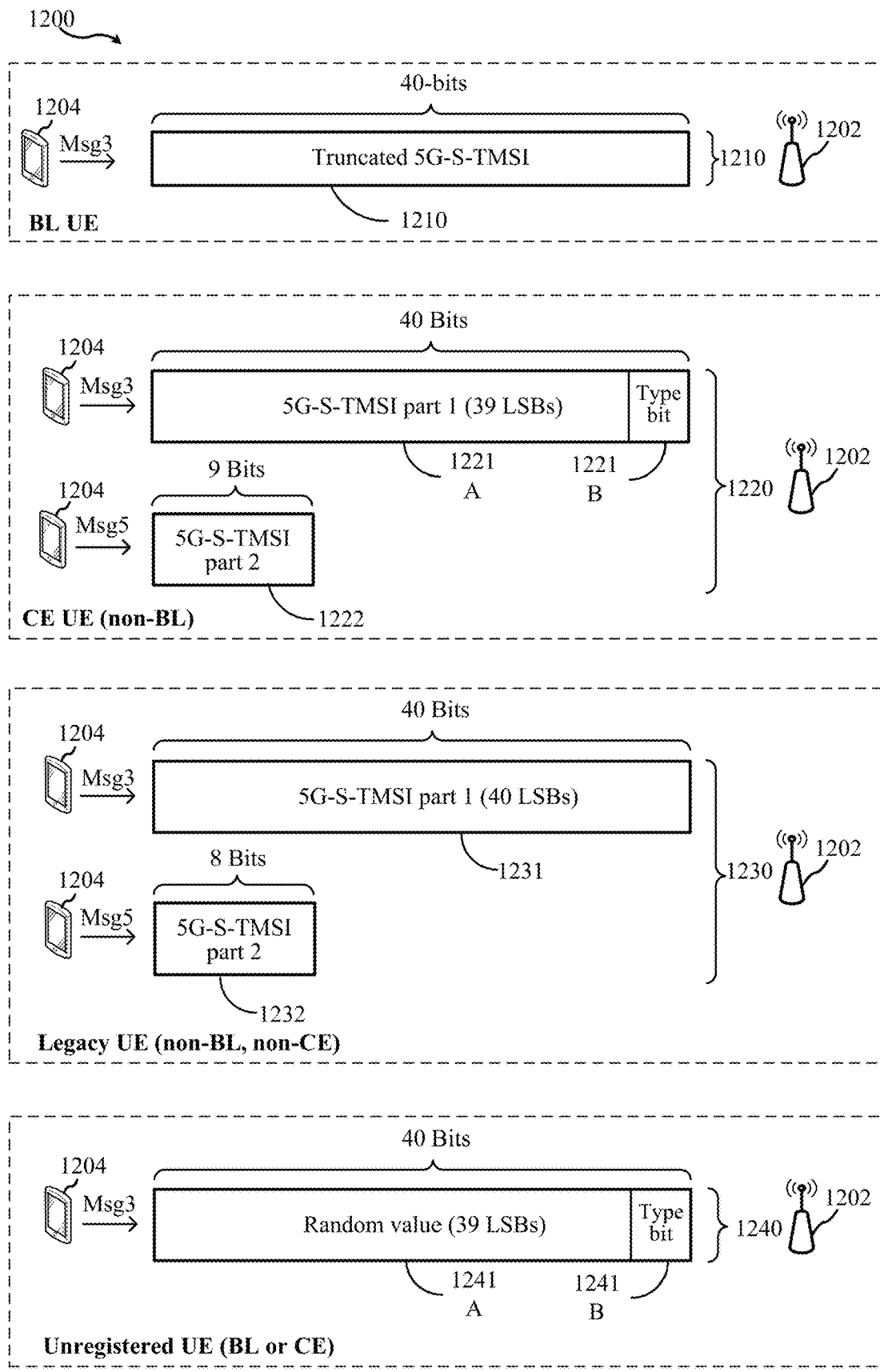
FIG. 12 shows an illustration depicting examples of initial UE identities that can be transmitted to a base station during an RRC connection establishment procedure.

FIG. 12 shows an illustration 1200 depicting examples of initial UE identities that can be transmitted to a base station during an RRC connection establishment procedure. As shown, the illustration 1200 includes a first initial UE identity 1210, a second initial UE identity 1220, and a third initial UE identity 1230. The first initial UE identity 1210 may include a 40-bit truncated 5G-S-TMSI discussed above with reference to FIG. 11. The truncated 5G-S-TMSI may be used by BL UEs, and may be transmitted to a base station (in its entirety) in an RRC connection request message.

The second initial UE identity 1220, which may be used by CE UEs, includes two portions 1221 and 1222. The first portion 1221 includes the 39 LSBs of a 5G-S-TMSI (1221A) and a UEID type bit (1221B), and may be transmitted to a base station in an RRC connection request message (Msg3) as the ng-5G-S-TMSI-Part1. The second portion 1222 includes the 9 MSBs of the 5G-S-TMSI, and may be transmitted to a base station in an RRC connection setup complete message (Msg5).

The third initial UE identity 1230, which may be used by ordinary UEs, includes two portions 1231 and 1232. The first portion 1231 includes the 40 LSBs of a 5G-S-TMSI, and may be transmitted to a base station in an RRC connection request message (Msg3) as the ng-5G-S-TMSI-Part1. The second portion 1232 includes the 8 MSBs of the 5G-S-TMSI, and may be transmitted to a base station in an RRC connection setup complete message (Msg5).

The fourth initial UE identity 1240, may be used by unregistered BL UEs and CE UEs in some aspects. Analogously with conventional RACH procedures for legacy UEs, an unregistered BL UE or CE UE may use a randomly or pseudo-randomly generated string as an initial identity when no TMSI has been assigned to the UE. The conventional random identity scheme is modified, however, with a UEID type bit so that an unregistered BL or CE UE may be distinguished from the first portion 1221 of the identity 1220, corresponding to a registered CE UE. Thus, the identity 1240 includes a 39-bit random value 1241A and an indicator bit 1241B.

Figure 13:
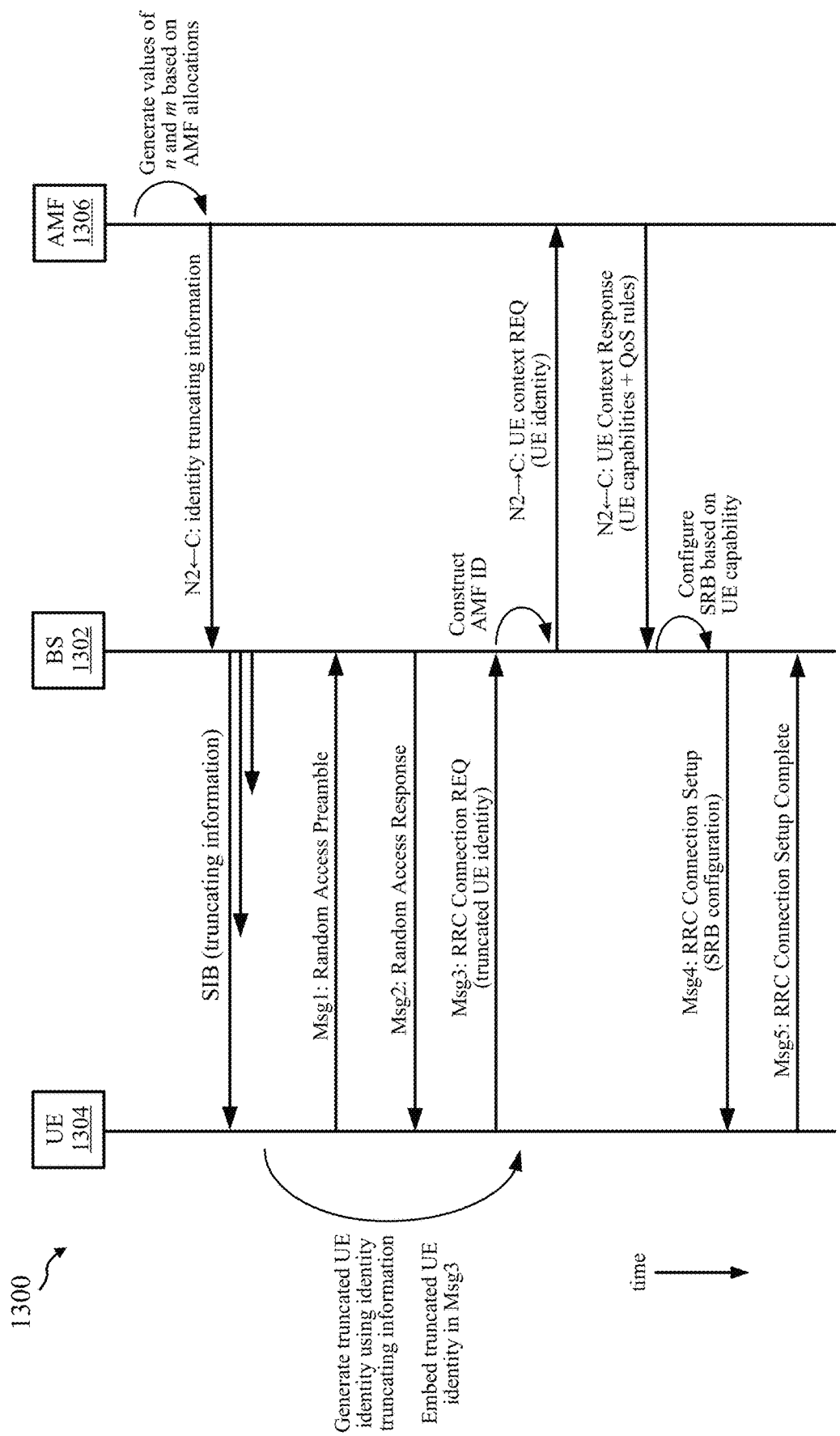
FIG. 13 shows a sequence diagram for wireless communication that supports early retrieval of UE capabilities.

FIG. 13 shows a sequence diagram 800 for wireless communication between a base station 1402, a UE 1404, and an AMF 1406 that supports early retrieval of UE capabilities in an access network. The base station 1402 may be one example of the base station 102 of FIG. 1, the base station 310 of FIG. 3, or the base station 402 of FIG. 4. The UE 1404 may be one example of the UE 104 of FIG. 1, the UE 304 of FIG. 3, or the UE 404 of FIG. 4. In some implementations, the AMF 1406 may be one example of the AMF 192 of FIG. 1. In some other implementations, the AMF 1406 may be any suitable network entity or network function that can establish a connection between the UE 1404 and a core network (not shown for simplicity).

For the example of FIG. 13, the AMF 1406 stores the UE context for the UE 1404, and may determine or obtain the values of n and m based on the number of AMF sets allocated to an associated AMF region and on the number of AMFs allocated to an associated AMF set. The AMF 1406 may provide identity truncating information containing the values of n and m to the base station 1402 via the N2 connection between the base station 1402 and a core network associated with the AMF 1406. The base station 1402 may broadcast the identity truncating information in one or more SIBs for reception by UEs within a coverage area of the base station 1402.

The UE 1404 receives the identity truncating information, and may use the identity truncating information to generate the truncated UE identity, for example, by truncating one or more fields of the UE identity. In some implementations, the identity truncating information includes the first value n indicating the number of LSBs of the AMF set identifier portion of the UE identity to retain when generating the truncated UE identity, and includes the second value m indicating the number of LSBs of the AMF pointer portion of the UE identity to retain when generating the truncated UE identity.

The UE 1404 may establish an access stratum connection with the base station 1402 using a random access procedure. In some aspects, the UE transmits a random access preamble (Msg1) to the base station 1402. The random access preamble may be transmitted on a random access channel (RACH), and may include a selected preamble sequence. The base station 1402 receives the random access preamble in Msg1, and transmits a random access response (Msg2) to the UE 1404. The random access response contains a random access preamble identifier that matches the preamble sequence of the random access preamble, and the UE 1404 may initiate an RRC connection procedure by transmitting an RRC connection request (Msg3) to the base station 1402.

The RRC connection request (Msg3) contains the truncated UE identity generated according to the identity truncating information. In some aspects, the truncated UE identity contains 40 bits, and may be embedded within the RRC connection request message (Msg3) by an eMTC device. The base station 1402 receives the truncated UE identity in Msg3, and constructs an AMF identifier based at least in part on the truncated UE identity.

In some implementations, the base station 1402 obtains the identity truncating information from the AMF 1406, and uses the values n and m to reconstruct the 5G-S-TMSI (or at least portions of the 5G-S-TMSI from which the base station 1402 can identify the AMF that stores capability information) for the UE 1404. In some aspects, construction of the AMF set identifier may be based on a number of MSBs of the AMF set identifier and the AMF pointer. In other aspects, construction of the AMF set identifier may be based on the LSBs of the AMF set identifier and the AMF pointer.

The base station 1402 sends a request for the UE's context to the identified AMF 1406 via an N2 connection. The AMF 1406 responds by sending the UE context to the base station 1402 via the N2 connection. In some implementations, the UE context includes at least the UE capabilities and Inter UE-QoS information. The base station 1402 uses the UE capabilities to select or determine the SRB1 configuration for the UE 1404, for example, so that the SRB configuration can be tailored or optimized based on the specific capabilities and/or constraints of the UE 1404.

The base station 1402 transmits the SRB1 configuration to the UE 1404 in an RRC connection setup message (Msg4). The UE 1404 receives Msg4, determines its SRB1 configuration, and transmits an RRC connection setup complete message (Msg5) to the base station 1402. Reception of Msg5 by the base station 1402 may conclude the RRC connection establishment procedure.

Figure 14:
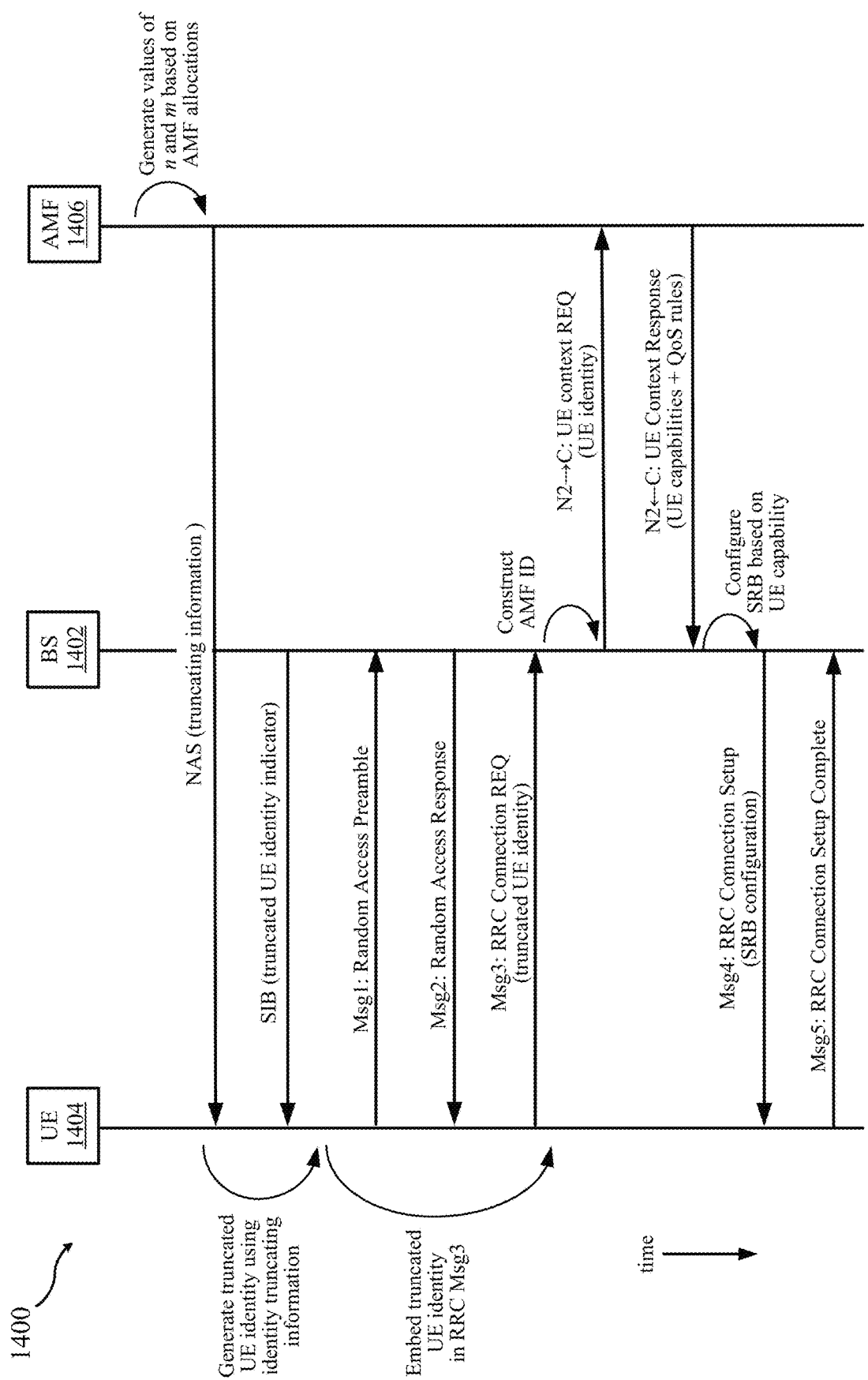
FIG. 14 shows another sequence diagram for wireless communication that supports early retrieval of UE capabilities.

FIG. 14 shows a sequence diagram 1400 for wireless communication between a base station 1402, a UE 1404, and an AMF 1406 that supports early retrieval of UE capabilities in an access network according to some aspects of this disclosure. The base station 1402 may be one example of the base station 102 of FIG. 1, the base station 310 of FIG. 3, or the base station 402 of FIG. 4. The UE 1404 may be one example of the UE 104 of FIG. 1, the UE 304 of FIG. 3, or the UE 404 of FIG. 4. In some implementations, the AMF 1406 may be one example of the AMF 192 of FIG. 1. In some other implementations, the AMF 1406 may be any suitable network entity or network function that can establish a connection between the UE 1404 and a core network (not shown for simplicity).

The sequence diagram 1400 is similar to the sequence diagram 1300 of FIG. 13 in some aspects, and differs from the sequence diagram 1300 in other aspects. One difference is that in sequence diagram 1400, the UE 1404 receives the identity truncating information from the AMF 1406 via NAS signaling. In some implementations, the UE 1404 may transmit a NAS registration request message to the AMF 1406, and the AMF 1406 may respond by sending a NAS registration accept message containing the identity truncating information. The base station 1402 may broadcast one or more SIBs containing an indicator for the UE 1404 to embed the 40-bit truncated UE identity in the RRC connection request (Msg3), for example, rather than a portion of the 48-bit 5G-S-TMSI.

Figure 15:
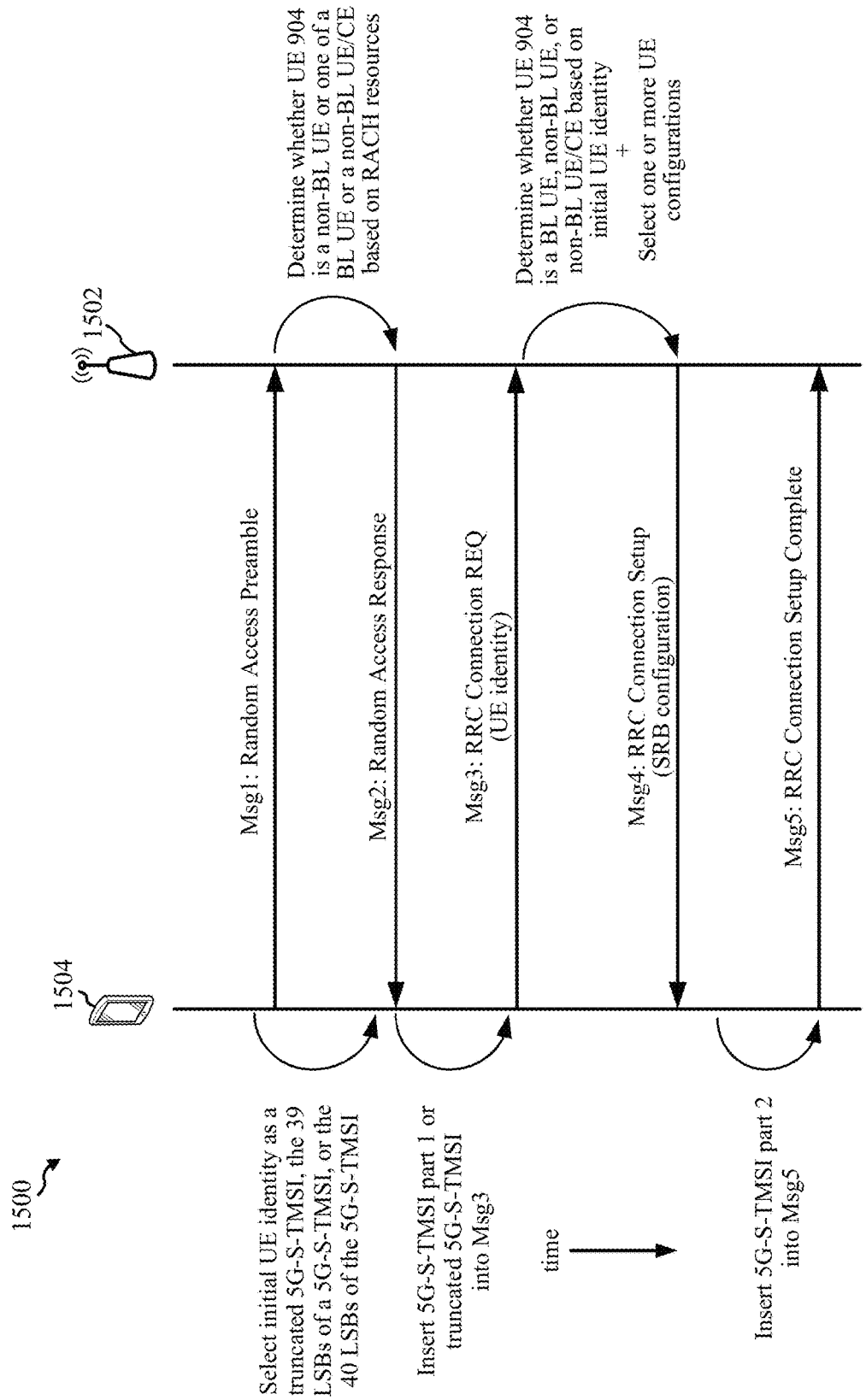
FIG. 15 shows a sequence diagram for wireless communication that supports establishing an RRC connection with a base station.

FIG. 15 shows a sequence diagram 1500 for wireless communication that supports establishing an RRC connection with a base station according to some aspects of this disclosure. The base station 1502 may be one example of the base station 102 of FIG. 1, the base station 310 of FIG. 3, the base station 402 of FIG. 4, or the scheduling entity 500 of FIG. 5. The UE 1504 may be one example of the UE 104 of FIG. 1, the UE 304 of FIG. 3, the UE 404 of FIG. 4, or the scheduled entity 600 of FIG. 6. In some implementations, the AMF 1506 may be one example of the AMF 192 of FIG. 1. In some other implementations, the AMF 1506 may be any suitable network entity or network function that can establish a connection between the UE 1502 and a core network (not shown for simplicity).

For the example of FIG. 15, the AMF 1506 stores the UE context for the UE 1504, and may determine or obtain the values of n and m based on the number of AMF sets allocated to an associated AMF region and on the number of AMFs allocated to an associated AMF set. The AMF 1506 may provide identity truncating information containing the values of n and m to the base station 1502 via the N2 connection between the base station 1502 and a core network associated with the AMF 1506. The base station 1502 may broadcast the identity truncating information in one or more SIBs for reception by UE's within a coverage area of the base station 1502.

In implementations for which the UE 1504 is a BL UE, the UE 1504 may use the identity truncating information to generate the truncated UE identity, for example, by truncating one or more fields of the UE identity. In some aspects, the identity truncating information includes the first value n indicating the number of LSBs of the AMF set identifier portion of the UE identity to retain when generating the truncated UE identity, and includes the second value m indicating the number of LSBs of the AMF pointer portion of the UE identity to retain when generating the truncated UE identity. For purposes of discussion, the truncated UE identity discussed in FIG. 9 is a truncated 5G-S-TMSI. In some aspects, the UE 1504 may indicate support of the truncated 5G-S-TMSI in a NAS registration request message (not shown for simplicity).

The UE 1504 may initiate an RRC connection establishment procedure by transmitting a random access preamble (Msg1) to the base station 1502. The random access preamble may be transmitted on a random access channel (RACH), and may include selected preamble sequence. The base station 1502 receives the random access preamble in Msg1, and transmits a random access response (Msg2) to the UE 1504. The random access response contains a random access preamble identifier that matches the preamble sequence of the random access preamble, and the UE 1504 may initiate an RRC connection procedure.

In some implementations, BL UEs and CE UEs use a first set of RACH resources to transmit the random access preamble, and ordinary UEs use a second set of RACH resources to transmit the random access preamble, where the first and second sets of RACH resources different than one another. In such implementations, the base station 1502 may determine whether the UE 1504 is an ordinary UE or one of a BL UE or a CE UE based on the RACH resources used to transmit the random access preamble.

The UE 1504 selects an initial UE identity, inserts the selected initial UE identity into the RRC connection request message (Msg3), and transmits Msg3 to the base station 1502. In some implementations, the UE 1504 selects the truncated 5G-S-TMSI as the initial UE identity when the UE 1504 is a BL UE, selects the 40 LSBs of the 5G-S-TMSI as the initial UE identity when the UE 1504 is an ordinary UE operating in normal coverage mode, and selects the 39 LSBs of the 5G-S-TMSI as the initial UE identity when the UE 1504 is a CE UE.

In some other implementations, in the absence of a 5G-S-TMSI assigned to the UE 1504, the UE 1504 may set as the initial UE identity a 40-bit random ID having an MSB that indicates that the UE is a BL UE, a CE UE, or an ordinary UE, followed by a 39-bit random number as the remaining 39 LSBs. As an example, the UE 1504 may set the MSB to '1' to indicate that the UE is a CE UE and may set the MSB to '0' to indicate that the UE is one of an ordinary UE or a BL UE.

The base station 1502 receives Msg3. In some implementations, the base station 1502 may determine whether the UE 1504 is a BL UE, an ordinary UE (neither BL nor CE), or a (non-BL) CE UE based on the initial UE identity provided in Msg3. In some aspects, the base station 1502 may determine that the UE 1504 is a BL UE based on the initial UE identity including a truncated 5G-S-TMSI, may determine that the UE 1504 is a CE UE based on the initial UE identity including the 39 most significant bits (MSBs) of a 5G-S-TMSI, or may determine that the UE 1504 is an ordinary UE based on the initial UE identity including the 40 MSBs of a 5G-S-TMSI. In some implementations, the base station 1502 may use the determined category and mode of the UE 1502 to select one or more of a supported maximum bandwidth, a transport block size (TBS), or any other radio optimization feature based on the UE capabilities retrieved from the AMF. The base station 1502 may also select an optimal signaling radio bearer (SRB) configuration for the UE based at least in part on the determined category and mode of the UE 1504.

The base station 1502 transmits the SRB1 configuration to the UE 1504 in an RRC connection setup message (Msg4). The UE 1504 receives Msg4, determines its SRB1 configuration, and transmits an RRC connection setup complete message (Msg5) to the base station 1502. In implementations for which the UE 1504 is one of an ordinary UE or a CE UE, the UE 1504 may transmit the remaining portion of the 5G-S-TMSI to the base station 1502 in Msg5. In some aspects, the UE 1504 transmits the 9 MSBs of the 5G-S-TMSI to the base station in the RRC connection setup complete message when the UE is an ordinary UE operating in the extended coverage mode, and transmits the 8 MSBs of the 5G-S-TMSI to the base station in the RRC connection setup complete message when the UE is an ordinary UE operating in normal coverage mode. Reception of Msg5 by the base station 1502 may conclude the RRC connection establishment procedure.

Figure 16:
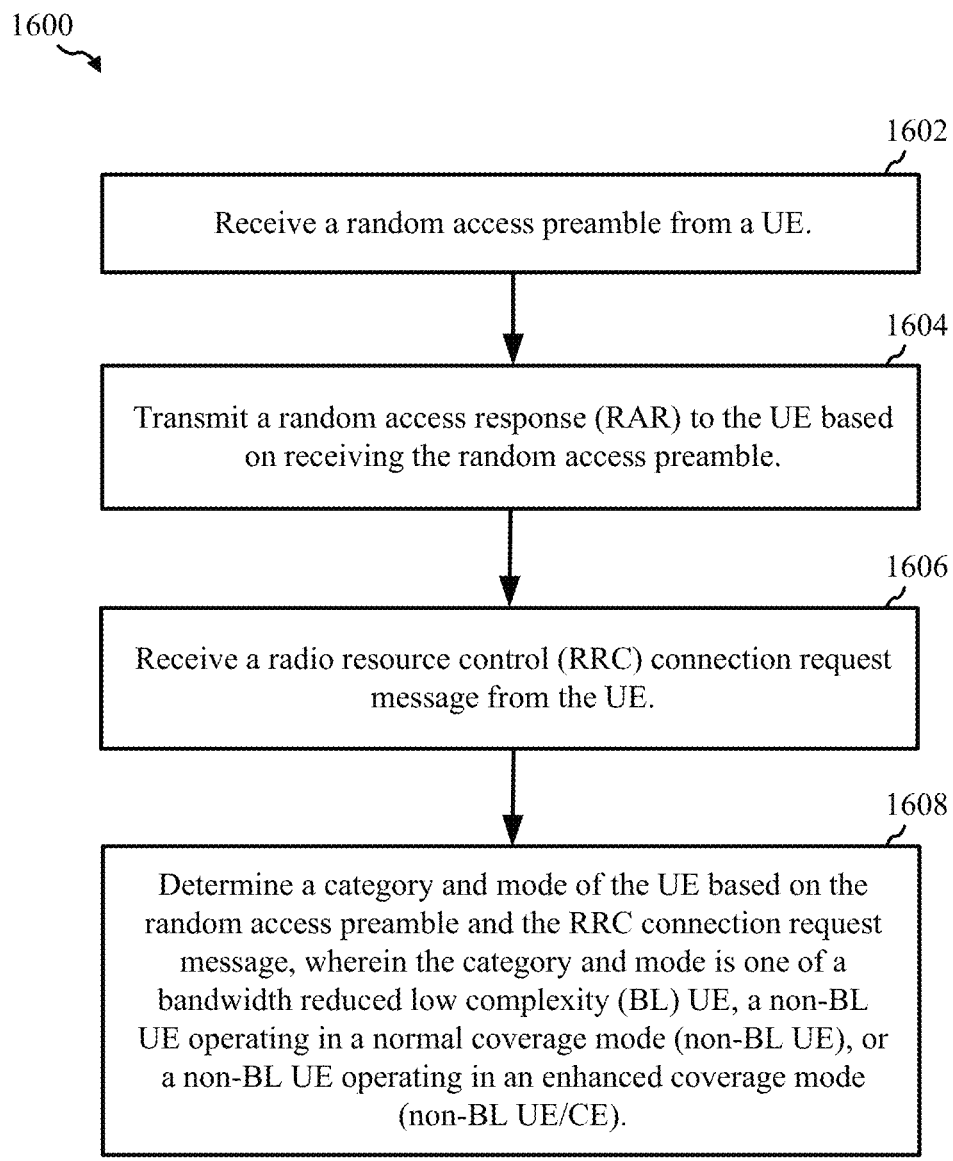
FIG. 16 shows a flowchart depicting example operations for wireless communication that supports determining a category and mode of a UE.

FIG. 16 shows a flowchart depicting an example process 1000 for wireless communication that supports early retrieval of UE capabilities. The process 1000 may be performed by a wireless communication device such as the base station 102 of FIG. 1, the base station 310 of FIG. 3, the base station 402 of FIG. 4, the base station 1302, 1402 of FIGS. 13-14, or the base station 1502 of FIG. 15. Although described with reference to a BS, a UE, and an AMF, the example process 1600 may be performed in conjunction with other suitable base stations, access nodes, TRPs, network functions, or network entities.

At block 1602, the base station receives a random access preamble from a user equipment (UE). At block 1604, the base station transmits a random access response (RAR) to the UE based on receiving the random access preamble. At block 1606, the base station receives a radio resource control (RRC) connection request message from the UE. At block 1608, the base station determines a category and mode of the UE based on the random access preamble and the RRC connection request message, where the category and mode is one of a bandwidth reduced low complexity (BL) UE, an ordinary UE operating in a normal coverage mode (an ordinary UE), or a non-BL UE operating in an enhanced coverage mode (CE UE).

Figure 17A:
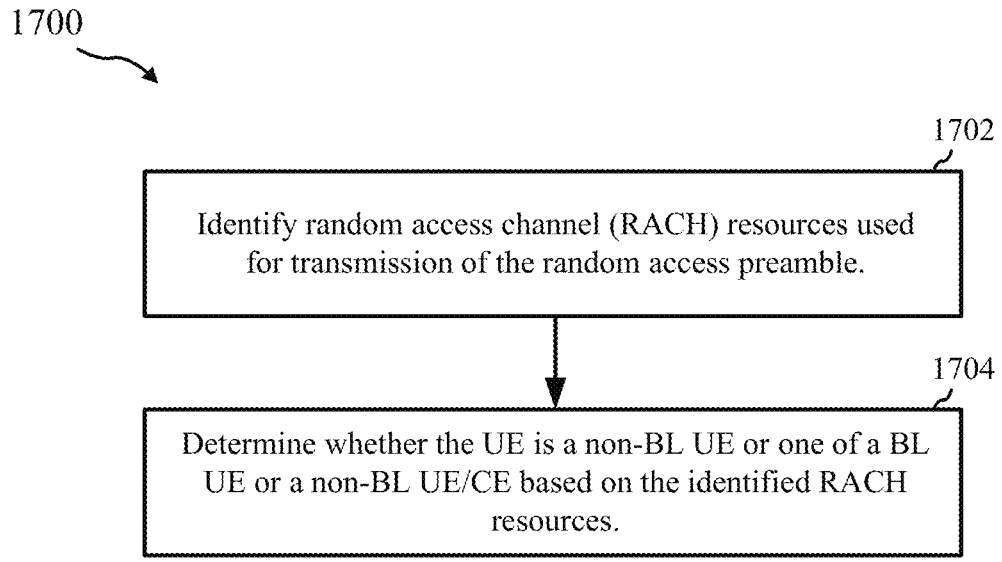
FIGS. 17A-17B show flowcharts depicting example operations for wireless communication that supports determining a category and mode of a UE.

FIG. 17A shows a flowchart depicting an example process 1700 for wireless communication that supports early retrieval of UE capabilities. The process 1700 may be performed by a wireless communication device operating as a scheduling entity (e.g., one or more of a BS 102, 302, 402, a scheduling entity 500, and/or a BS 1302, 1402, 1502). Although described with reference to a base station, a UE, and an AMF, the example process 1700 may be performed in conjunction with other suitable base stations, access nodes, TRPs, network functions, or network entities. In some implementations, the process 1700 may be one example of determining the category and mode of the UE in block 1608 of FIG. 16.

At block 1702, the base station identifies random access channel (RACH) resources used for transmission of the random access preamble. At block 1704, the base station determines whether the UE is an ordinary UE or one of a BL UE or a CE UE based on the identified RACH resources.

Figure 17B:
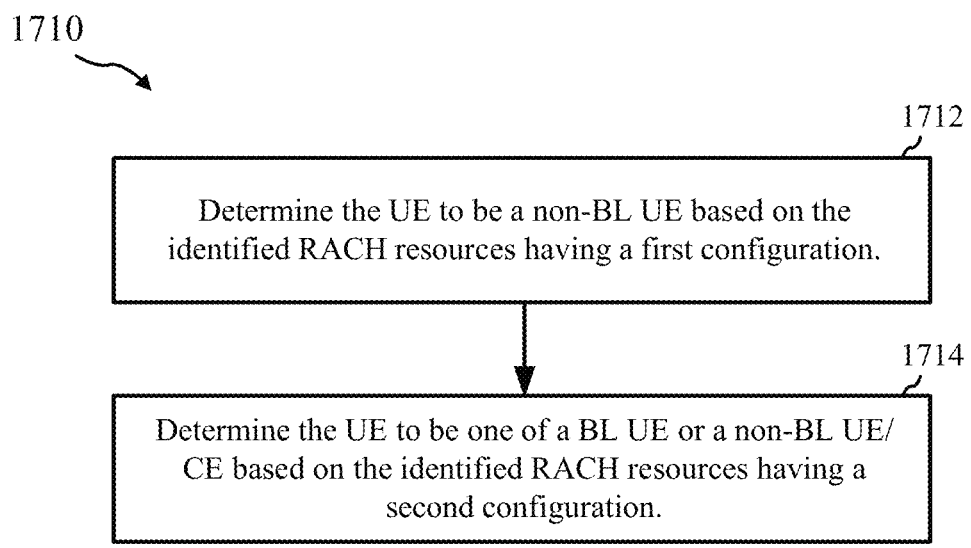

FIG. 17B shows a flowchart depicting an example process 1710 for wireless communication that supports early retrieval of UE capabilities. The process 1710 may be performed by a wireless communication device operating as a scheduling entity (e.g., one or more of a BS 102, 302, 402, a scheduling entity 500, and/or a BS 1302, 1402, 1502). In some implementations, the process 1710 may be one example of determining whether the UE is an ordinary UE or one of a BL UE or a CE UE in block 1704 of FIG. 17A.

At block 1712, the base station determines the UE to be an ordinary UE based on the identified RACH resources having a first configuration. At block 1714, the base station determines the UE to be one of a BL UE or a CE UE based on the identified RACH resources having a second configuration.

Figure 18A:
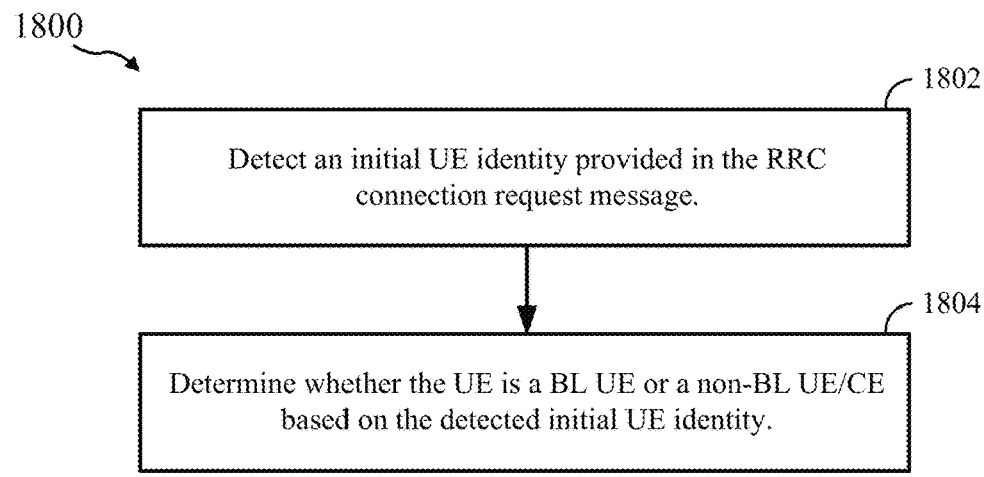
FIGS. 18-18C show flowcharts depicting example operations for wireless communication that supports determining a category and mode of a UE.

FIG. 18A shows a flowchart depicting an example process 1800 for wireless communication that supports early retrieval of UE capabilities. The process 1100 may be performed by a wireless communication device such as the base station 102 of FIG. 1, the base station 310 of FIG. 3, the base station 402 of FIG. 4, the base stations 1302, 1402 of FIGS. 13-14, or the base station 1502 of FIG. 15. Although described with reference to a base station, a UE, and an AMF, the example process 1800 may be performed in conjunction with other suitable base stations, access nodes, TRPs, network functions, or network entities. In some implementations, the process 1800 may be one example of determining the category and mode of the UE in block 1608 of FIG. 16.

At block 1802, the base station detects an initial UE identity provided in the RRC connection request message. At block 1804, the base station determines whether the UE is a BL UE or a CE UE based on the detected initial UE identity.

Figure 18B:
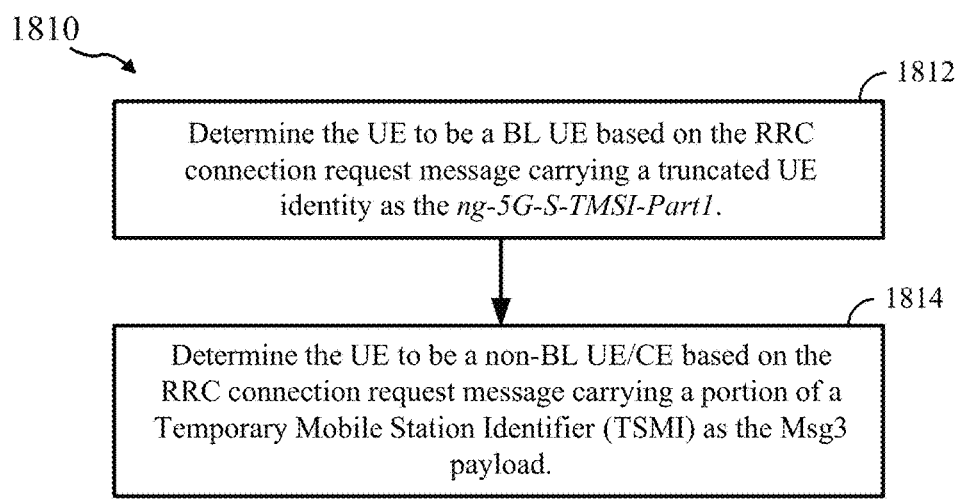

FIG. 18B shows a flowchart depicting an example process 1810 for wireless communication that supports early retrieval of UE capabilities. The process 1810 may be performed by a wireless communication device operating as a scheduling entity (e.g., one or more of a BS 102, 302, 402, a scheduling entity 500, and/or a BS 1302, 1402, 1502). In some aspects, the process 1810 may be one example of determining whether the UE is a BL UE or a CE UE in block 1804 of the process 1800 of FIG. 18A.

At block 1812, the base station determines the UE to be a BL UE based on the RRC connection request message carrying a truncated UE identity as the ng-5G-S-TMSI-Part1. At block 1814, the base station determines the UE to be a CE UE based on the RRC connection request message carrying a portion of a Temporary Mobile Station Identifier (TMSI). In some implementations, the portion of the TMSI consists of 39 least significant bits (LSBs) of a 5G-S-TMSI. In some instances, the request message further includes a UEID type bit indicating whether the 39 LSBs contain a portion of the 5G-S-TMSI or a randomly selected number. In some other instances, a first value of the UEID type bit indicates that the UE is a CE UE, and a second value of the UEID type bit indicates that the UE is an unregistered UE as described above in connection with FIG. 12. Meanwhile, legacy UEs (i.e., ordinary, non-BL, non-CE UEs) may be distinguished from BL UEs and CE UEs based on distinct resources used for communication between legacy UEs and the BS.

Figure 18C:
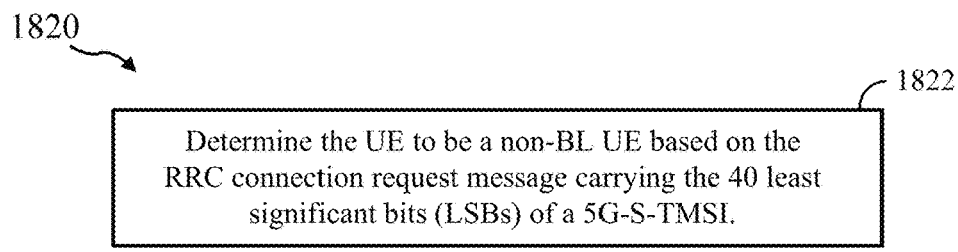

FIG. 18C shows a flowchart depicting an example process 1820 for wireless communication that supports early retrieval of UE capabilities. The process 1820 may be performed by a wireless communication device (e.g., one or more of a BS 102, 302, 402, a scheduling entity 500, and/or a BS 1302, 1402, 1502).

At block 1822, the base station determines the UE to be an ordinary UE based on the RRC connection request message carrying the 40 least significant bits (LSBs) of a 5G-S-TMSI. In some implementations, the truncated UE identity is a 40-bit truncated 5G-S-TMSI. In some instances, the truncated 5G-S-TMSI consists of a first number n of least significant bits (LSBs) of an Access and Mobility Management Function (AMF) set identifier, a second number m of LSBs of a AMF pointer, and (40–n–m) bits of a TMSI associated with the UE. In some other instances, BL UEs are configured to provide the truncated 5G-S-TMSI to the base station during RRC connection establishment sessions, and ordinary UEs are configured to provide a portion of the 5G-S-TMSI to the base station during RRC connection establishment sessions.

Figure 19A:
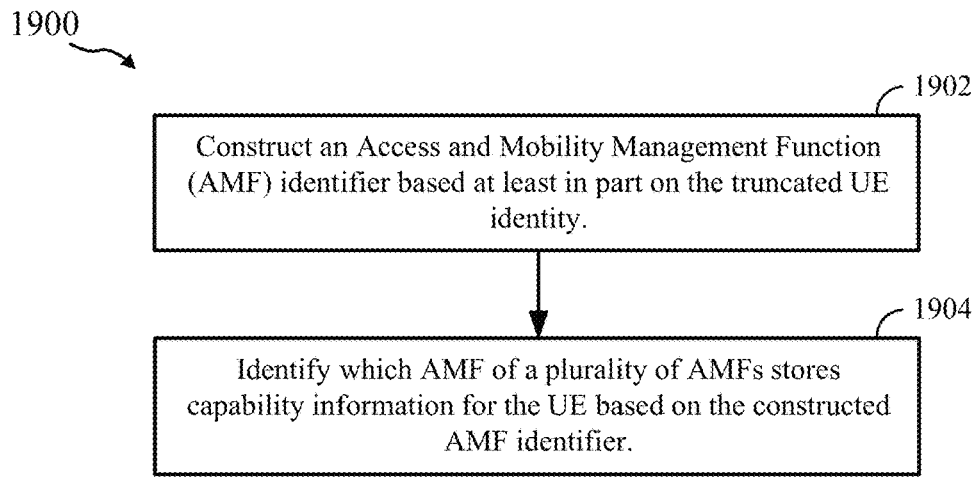
FIG. 19A shows a flowchart depicting example operations for wireless communication that supports early retrieval of UE capabilities.

FIG. 19A shows a flowchart depicting an example process 1900 for wireless communication that supports early retrieval of UE capabilities. The process 1900 may be performed by a wireless communication device such (e.g., one or more of a BS 102, 302, 402, a scheduling entity 500, and/or a BS 1302, 1402, 1502). Although described with reference to a BS, a UE, and an AMF, the example process 1300 may be performed in conjunction with other suitable base stations, access nodes, TRPs, network functions, or network entities. In some implementations, the process 1900 begins after the process 1820 described with reference to FIG. 18C.

At block 1902, the base station constructs an Access and Mobility Management Function (AMF) identifier based at least in part on the truncated UE identity. At block 1904, the base station identifies which AMF of a plurality of AMFs stores capability information for the UE based on the constructed AMF identifier.

Figure 19B:
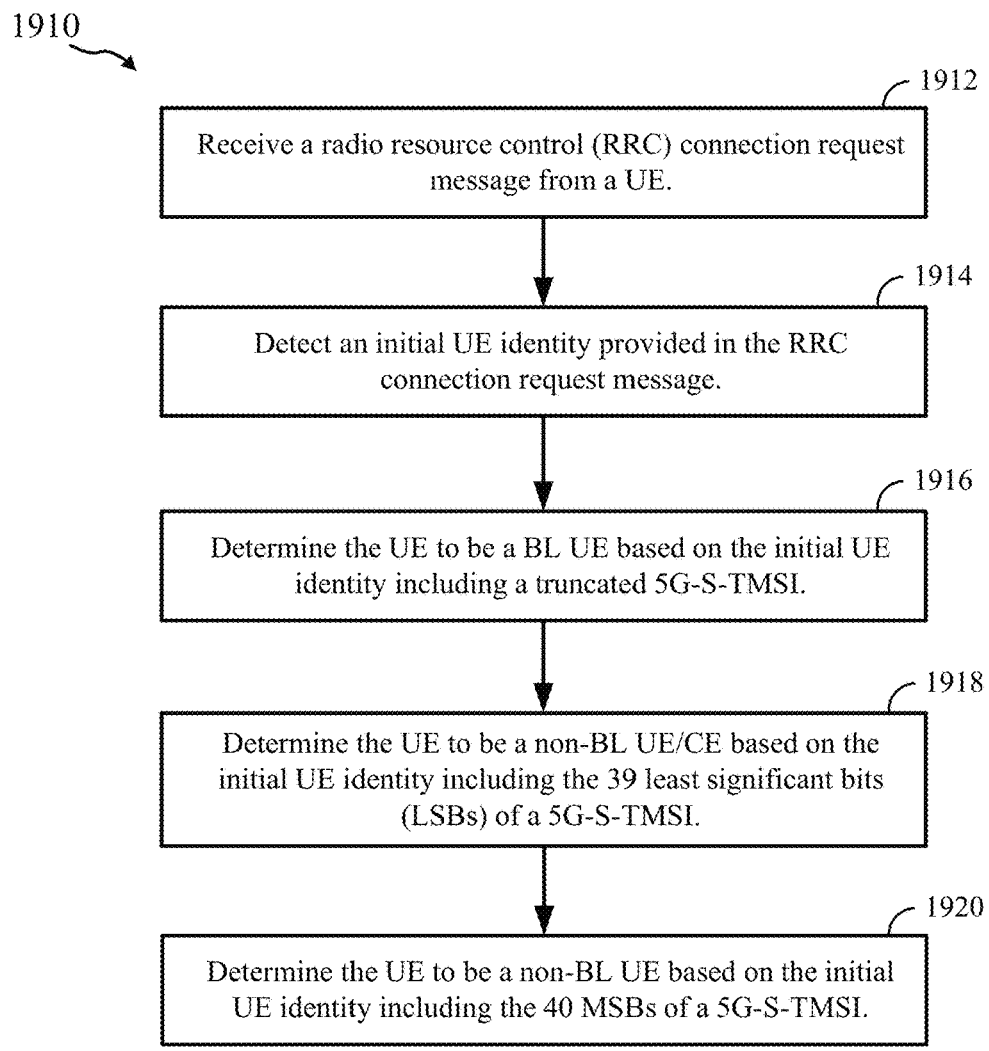
FIG. 19B shows a flowchart depicting example operations for wireless communication that supports determining a category and mode of a UE.

FIG. 19B shows a flowchart depicting an example process 1910 for wireless communication that supports early retrieval of UE capabilities. The process 1910 may be performed by a wireless communication device (e.g., one or more of a BS 102, 302, 402, a scheduling entity 500, and/or a BS 1302, 1402, 1502). Although described with reference to a BS, a UE, and an AMF, the example process 1910 may be performed in conjunction with other suitable base stations, access nodes, TRPs, network functions, or network entities.

At block 1912, the base station receives a radio resource control (RRC) connection request message from a UE. At block 1914, the base station detects an initial UE identity provided in the RRC connection request message. At block 1916, the base station determines the UE to be a BL UE based on the initial UE identity including a truncated 5G-S-TMSI. At block 1918, the base station determines the UE to be a CE UE based on the initial UE identity including the 39 least significant bits (LSBs) of a 5G-S-TMSI. At block 1920, the base station determines the UE to be an ordinary UE based on the initial UE identity including the 40 LSBs of a 5G-S-TMSI.

In some implementations, the truncated UE identity is a 40-bit truncated 5G-S-TMSI. In some instances, the truncated 5G-S-TMSI consists of a first number n of least significant bits (LSBs) of an AMF set identifier, a second number m of LSBs of a AMF pointer, and (40–n–m) bits of a TMSI associated with the UE.

Figure 20A:
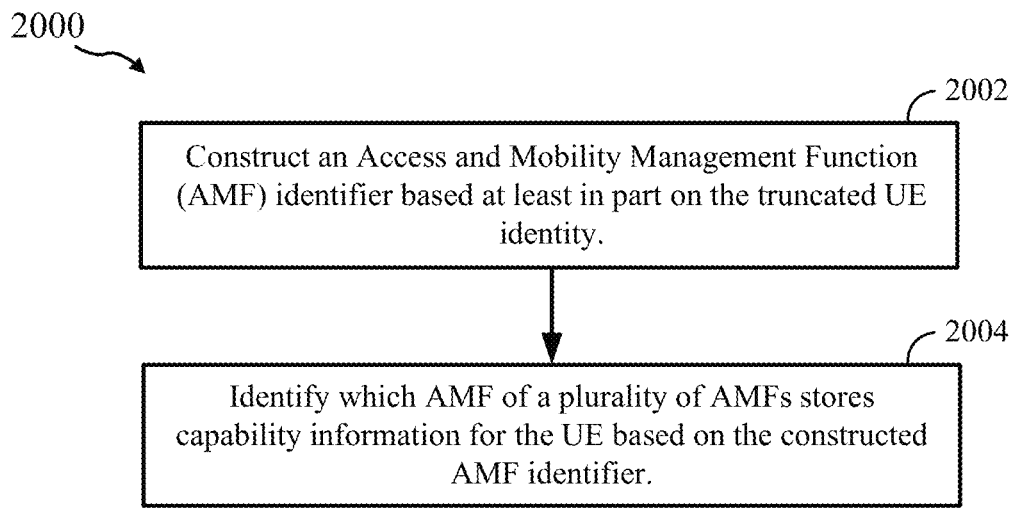
FIG. 20A shows a flowchart depicting example operations for wireless communication that supports early retrieval of UE capabilities.

FIG. 20A shows a flowchart depicting an example process 2000 for wireless communication that supports early retrieval of UE capabilities. The process 2000 may be performed by a wireless communication device (e.g., one or more of a BS 102, 302, 402, a scheduling entity 500, and/or a BS 1302, 1402, 1502). Although described with reference to a BS, a UE, and an AMF, the example process 2000 may be performed in conjunction with other suitable base stations, access nodes, TRPs, network functions, or network entities. In some implementations, the process 2000 begins after the process 1910 described with reference to FIG. 19B.

At block 2002, the base station constructs an Access and Mobility Management Function (AMF) identifier based at least in part on the truncated UE identity. At block 2004, the base station identifies which AMF of a plurality of AMFs stores capability information for the UE based on the constructed AMF identifier.

Figure 20B:
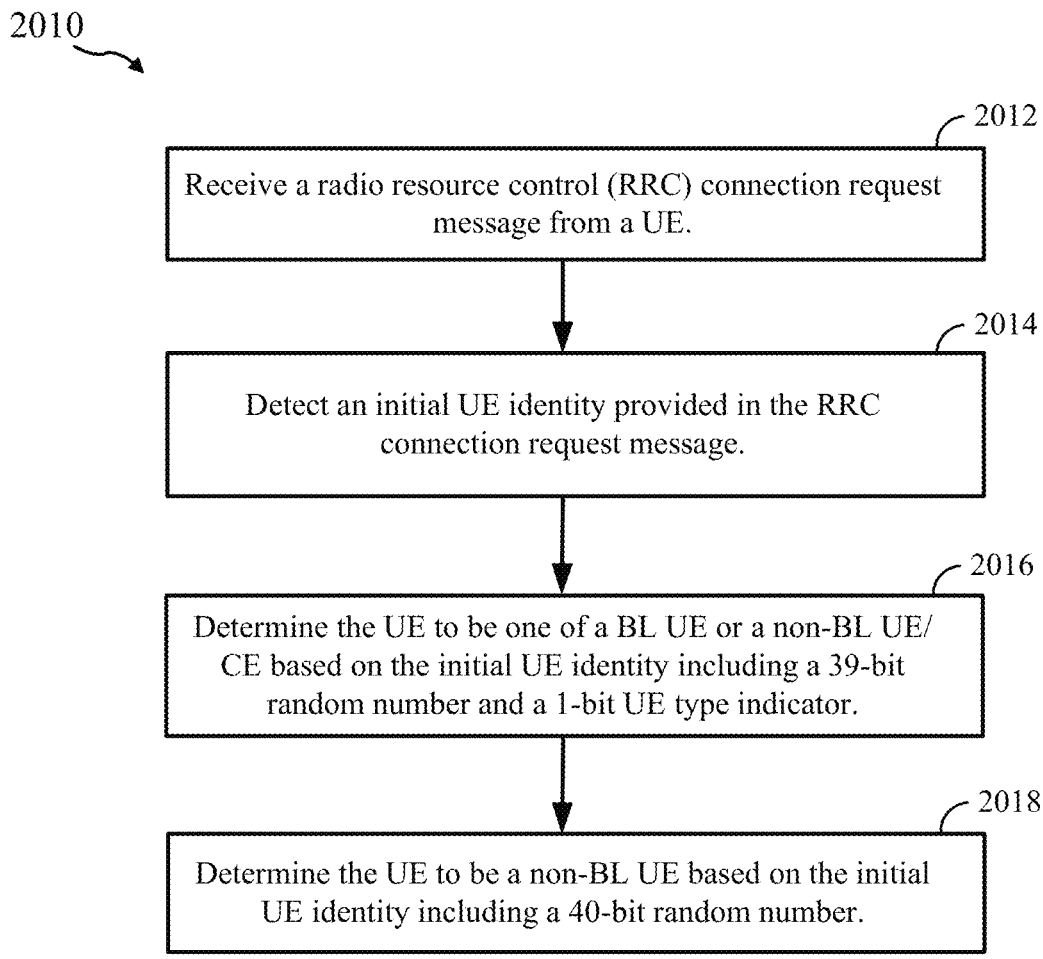
FIG. 20B shows a flowchart depicting example operations for wireless communication that supports determining a category and mode of a UE.

FIG. 20B shows a flowchart depicting an example process 2010 for wireless communication that supports early retrieval of UE capabilities. The process 2010 may be performed by a wireless communication device (e.g., one or more of a BS 102, 302, 402, a scheduling entity 500, and/or a BS 1302, 1402, 1502). Although described with reference to a BS, a UE, and an AMF, the example process 2010 may be performed in conjunction with other suitable base stations, access nodes, TRPs, network functions, or network entities.

At block 2012, the base station receives a radio resource control (RRC) connection request message from a UE. At block 2014, the base station detects an initial UE identity provided in the RRC connection request message.

At block 2016, the base station determines the UE to be one of a BL UE or a CE UE based on the initial UE identity including a 39-bit random number and a 1-bit UEID type indicator. At block 2018, the base station determines the UE to be an ordinary UE based on the initial UE identity including a 40-bit random number.

Figure 21A:
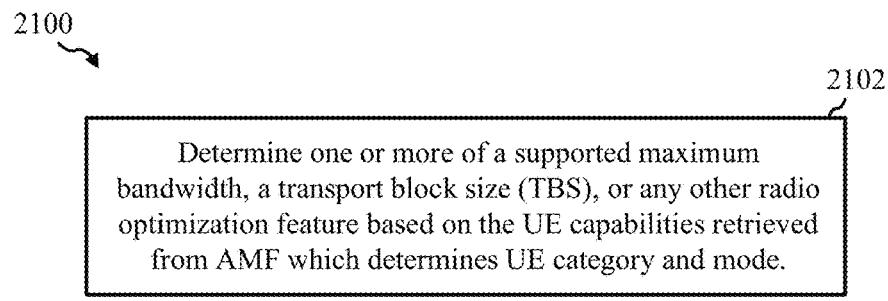
FIG. 21A shows a flowchart depicting example operations for wireless communication that supports early retrieval of UE capabilities.

FIG. 21A shows a flowchart depicting an example process 2100 for wireless communication that supports early retrieval of UE capabilities. The process 2100 may be performed by a wireless communication device operating as a scheduling entity (e.g., one or more of a BS 102, 302, 402, a scheduling entity 500, and/or a BS 1302, 1402, 1502). Although described with reference to a BS, a UE, and an AMF, the example process 2100 may be performed in conjunction with other suitable base stations, access nodes, TRPs, network functions, or network entities. At block 2102, the base station determines one or more of a supported maximum bandwidth, a transport block size (TBS), or any other radio optimization feature based on the UE capabilities retrieved from AMF which determines UE category and mode.

Figure 21B:
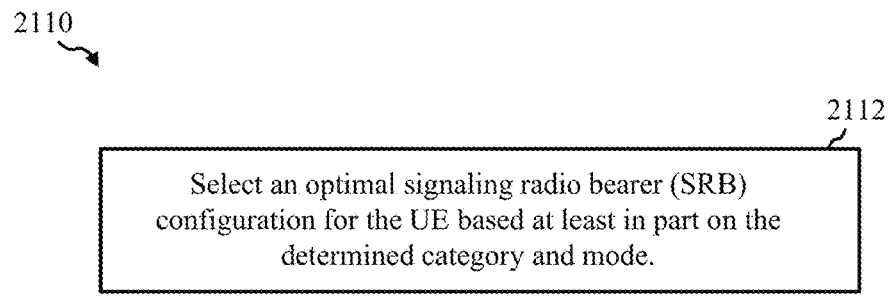
FIG. 21B shows a flowchart depicting example operations for wireless communication that supports early retrieval of UE capabilities.

FIG. 21B shows a flowchart depicting an example process 2110 for wireless communication that supports early retrieval of UE capabilities. The process 2110 may be performed by a wireless communication device operating as a scheduling entity (e.g., one or more of a BS 102, 302, 402, a scheduling entity 500, and/or a BS 1302, 1402, 1502).

Although described with reference to a BS, a UE, and an AMF, the example process 2110 may be performed in conjunction with other suitable base stations, access nodes, TRPs, network functions, or network entities. At block 2112, the base station selects an optimal signaling radio bearer (SRB) configuration for the UE based at least in part on the determined category and mode.

Figure 21C:
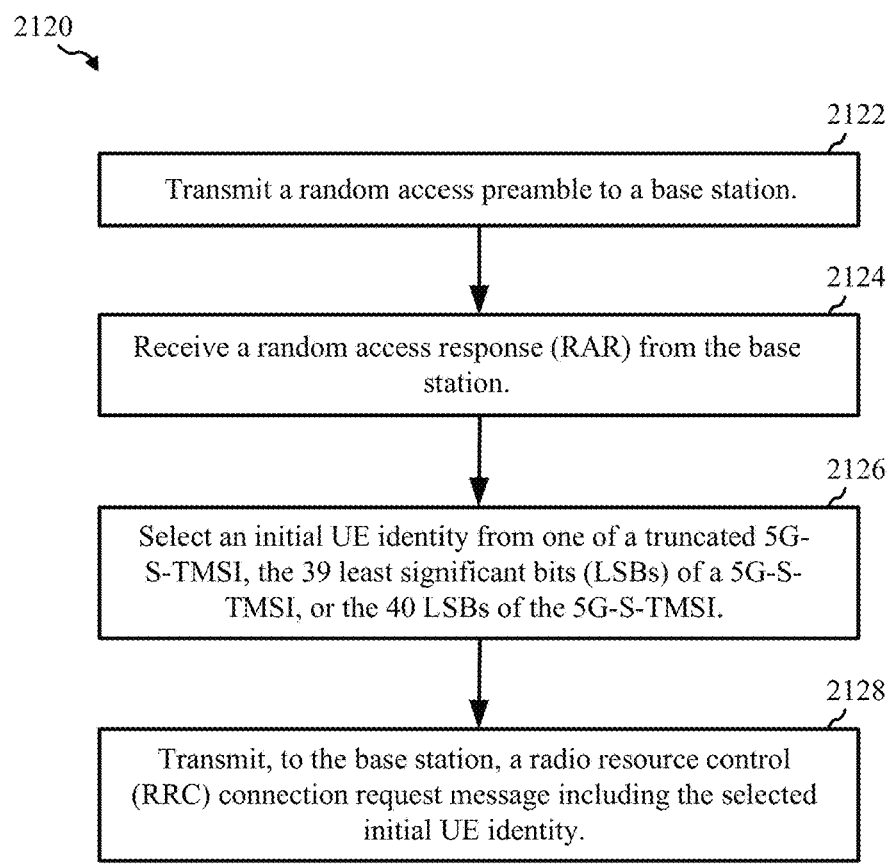
FIG. 21C shows a flowchart depicting example operations for wireless communication that supports selecting a category and mode of a UE.

FIG. 21C shows a flowchart depicting an example process 2120 for wireless communication that supports establishing an RRC connection with a base station. The process 2120 may be performed by a wireless communication device (e.g., one or more of a BS 102, 302, 402, a scheduling entity 500, and/or a BS 1302, 1402, 1502). Although described with reference to a BS, a UE, and an AMF, the example process 2120 may be performed in conjunction with other suitable base stations, access nodes, TRPs, network functions, or network entities.

At block 2122, the UE transmits a random access preamble to a base station. At block 2124, the UE receives a random access response (RAR) from the base station. At block 2126, the UE selects an initial UE identity from one of a truncated 5G-S-TMSI, the 39 least significant bits (LSBs) of a 5G-S-TMSI, or the 40 LSBs of the 5G-S-TMSI. At block 1908, the UE transmits, to the base station, a radio resource control (RRC) connection request message including the selected initial UE identity.

Figure 22A:
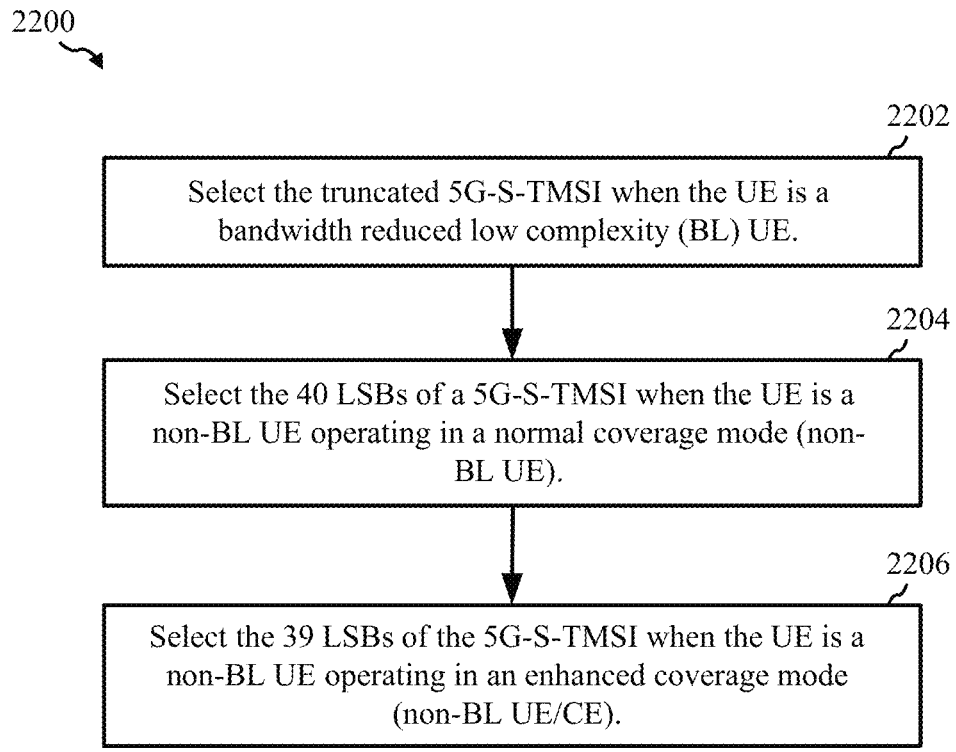
FIG. 22A shows a flowchart depicting example operations for wireless communication that supports selecting a category and mode of a UE.

FIG. 22A shows a flowchart depicting an example process 2200 for wireless communication that supports establishing an RRC connection with a base station. The process 2200 may be performed by a wireless communication device (e.g., one or more of the UEs 104, 304, 404, the scheduled entity 500, and/or the UEs 1304, 1404, 1504). Although described with reference to a BS, a UE, and an AMF, the example process 2200 may be performed in conjunction with other suitable base stations, access nodes, TRPs, network functions, or network entities. In some implementations, the process 2200 may be one example of selecting an initial UE identity in block 2126 of FIG. 21C.

At block 2202, the UE selects the truncated 5G-S-TMSI when the UE is a bandwidth reduced low complexity (BL) UE. At block 2004, the UE selects the 40 LSBs of a 5G-S-TMSI when the UE is an ordinary UE operating in a normal coverage mode (ordinary UE). At block 2206, the UE selects the 39 LSBs of the 5G-S-TMSI when the UE is an ordinary UE operating in an enhanced coverage mode (CE UE).

Figure 22B:
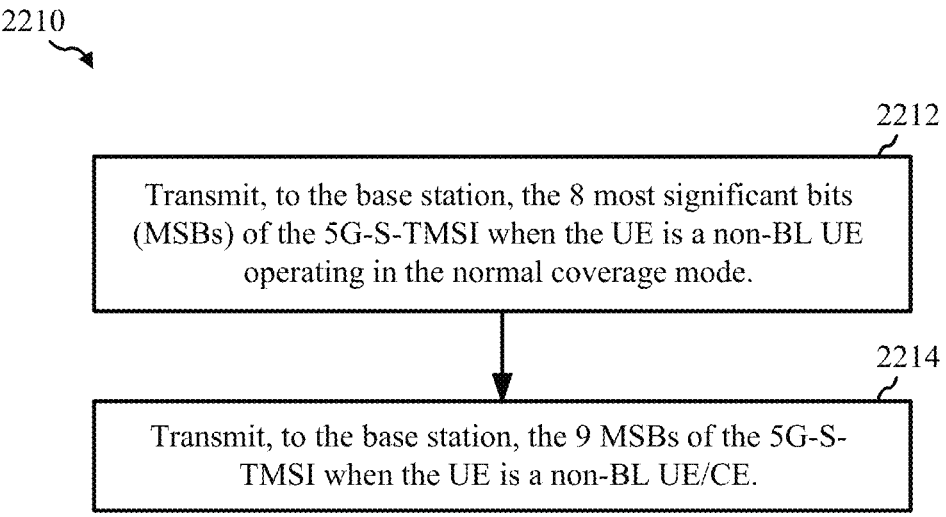
FIG. 22B shows a flowchart depicting example operations for wireless communication that supports selecting a category and mode of a UE.

FIG. 22B shows a flowchart depicting an example process 2210 for wireless communication that supports establishing an RRC connection with a base station. The process 2210 may be performed by a wireless communication device (e.g., one or more of: the UEs 104, 304, 404, the scheduled entity 600, or the UEs 1304, 1404, 1504). Although described with reference to a BS, a UE, and an AMF, the example process 2210 may be performed in conjunction with other suitable base stations, access nodes, TRPs, network functions, or network entities. In some implementations, the process 2210 begins after the process 2200 described with reference to FIG. 22A.

At block 2212, the UE transmits, to the base station, the 8 most significant bits (MSBs) of the 5G-S-TMSI when the UE is an ordinary UE operating in the normal coverage mode. At block 2214, the UE transmits, to the base station, the 9 MSBs of the 5G-S-TMSI when the UE is a CE UE. In some implementations, the MSBs of the 5G-S-TMSI are transmitted to the base station in an RRC connection setup complete message. In some instances, the truncated 5G-S-TMSI identifies an Access and Mobility Management Function (AMF) storing capabilities of the UE. In some other instances, the truncated 5G-S-TMSI is constructed from a 5G-S-TMSI based on identity truncating information received from at least one of the base station or a 5G core network. In some instances, the truncated 5G-S-TMSI consists of a first number n of least significant bits (LSBs) of an AMF set identifier, a second number m of LSBs of a AMF pointer, and (40−n−m) bits of a TMSI associated with the UE.

In some implementations, the first number n and the second number m are identity truncating information for constructing the truncated 5G-S-TMSI from a 5G-S-TMSI assigned to the UE by an AMF of a 5G core network. In some instances, the first number n and the second number m are configured in a NAS registration accept message.

Figure 23A:
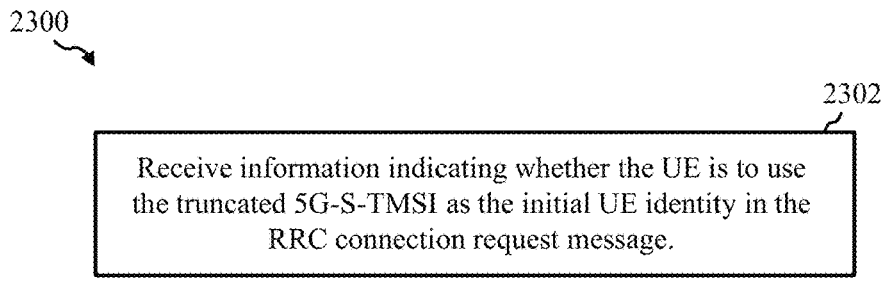
FIG. 23A shows a flowchart depicting example operations for wireless communication that supports selecting a category and mode of a UE.

FIG. 23A shows a flowchart depicting an example process 2300 for wireless communication that supports establishing an RRC connection with a base station. The process 2300 may be performed by a wireless communication device (e.g., one of more of a UE 104, 304, 404, a scheduled entity 600, and/or a UE 1304, 1404, 1504). Although described with reference to a BS, a UE, and an AMF, the example process 2300 may be performed in conjunction with other suitable base stations, access nodes, TRPs, network functions, or network entities. In some implementations, the process 2300 begins after the process 2210 described with reference to FIG. 22B.

At block 2302, the UE receives information indicating whether the UE is to use the truncated 5G-S-TMSI as the initial UE identity in the RRC connection request message. In some implementations, the information is received from the base station in a system information block (SIB).

Figure 23B:
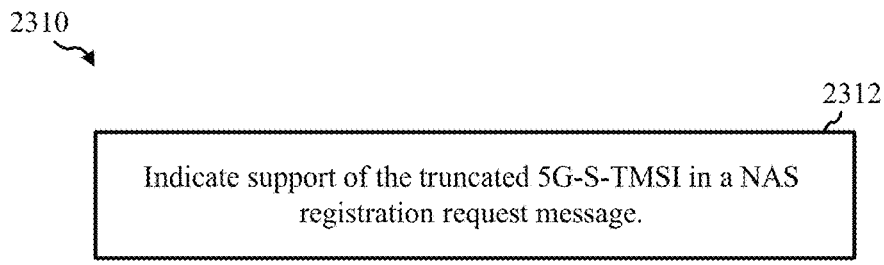
FIG. 23B shows a flowchart depicting example operations for wireless communication that supports selecting a category and mode of a UE.

FIG. 23B shows a flowchart depicting an example process 2310 for wireless communication that supports establishing an RRC connection with a base station. The process 2310 may be performed by a wireless communication device (e.g., one of more of a UE 104, 304, 404, a scheduled entity 600, and/or a UE 1304, 1404, 1504). Although described with reference to a BS, a UE, and an AMF, the example process 2310 may be performed in conjunction with other suitable base stations, access nodes, TRPs, network functions, or network entities. In some implementations, the process 2310 begins after the process 2300 described with reference to FIG. 23A.

At block 2312, the UE indicates support of the truncated 5G-S-TMSI in a NAS registration request message. In some implementations, the information is received from the base station in a system information block (SIB).

Figure 23C:
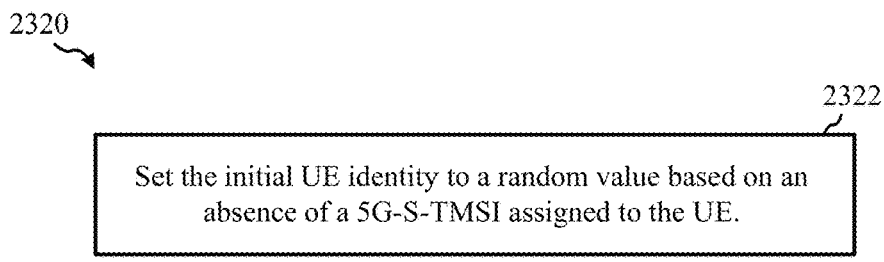
FIGS. 23C-23D show flowcharts depicting example operations for wireless communication that supports selecting a category and mode of a UE.

FIG. 23C shows a flowchart depicting an example process 2320 for wireless communication that supports establishing an RRC connection with a base station. The process 2320 may be performed by a wireless communication device operating as a scheduled entity (e.g., one or more of a UE 104, 304, 404, a scheduled entity, and/or a UE 1304, 1404, 1504). Although described with reference to a BS, a UE, and an AMF, the example process 2320 may be performed in conjunction with other suitable base stations, access nodes, TRPs, network functions, or network entities. In some implementations, the process 2320 begins after the process 2310 described with reference to FIG. 23B. At block 2322, the UE sets the initial UE identity to a random value based on an absence of a 5G-S-TMSI assigned to the UE.

Figure 23D:
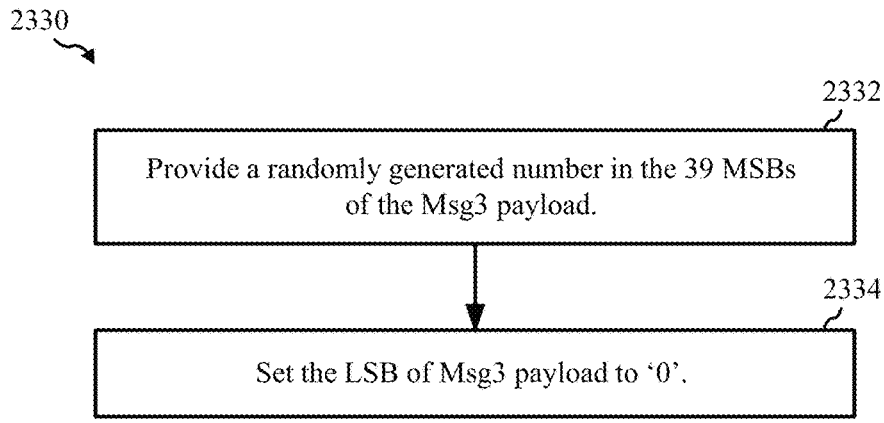

FIG. 23D shows a flowchart depicting an example process 2330 for wireless communication that supports establishing an RRC connection with a base station. The process 2330 may be performed by a wireless communication device operating as a scheduled entity or UE (e.g., one of more of a UE 104, 304, 404, a scheduled entity 600, and/or a UE 1304, 1404, 1504). In some implementations, the process 2330 may be one example of setting the initial UE identity to a random value in block 2322 of the process 2320.

At block 2332, the UE provides a randomly generated number as the 39 MSBs of a 40-bit UE identification. At block 2334, the UE sets the LSB of the 40-bit UE identification to '0.'

FURTHER EXAMPLES HAVING A VARIETY OF FEATURES

Example 1: An apparatus, method, device, system, equipment, and/or article of manufacture for wireless communication as a base-station (BS) capable of communication with a core network. Example 1 includes receiving a first random access (RA) preamble from user equipment (a UE) originating the first RA request via a transceiver. This example also includes receiving, via the transceiver, a first connection request associated with the first RA request. This example also includes sending a first UE context request to the core network, and receiving capability information corresponding for the UE originating the first RA request from the core network. The first UE context request includes a first UE identifier (UEID) generated based on the first connection request. This example also includes transmitting, via the transceiver, first RRC configuration information to the UE originating the first RA request using a signaling radio bearer (SRB) configured according to the capability information.

Example 2: The apparatus, method, device, system, equipment, and/or article of manufacture of Example 1 in which the first connection request includes a first payload consisting of N bits, the first payload comprising a truncated identifier that includes the first UEID and first access and mobility management function (AMF) information.

Example 3: The apparatus, method, device, system, equipment, and/or article of manufacture of Example 1, in which the first AMF information consists of a first number n of least significant bits (LSBs) of an AMF set identifier and a second number m of LSBs of an AMF pointer. In this example, the first UEID consists of (N−n−m) bits of a temporary mobile subscriber identity (TMSI) associated with the first UE. In this example, transmitting the first UE context request to the core network includes transmitting the first UE context request to an AMF instance identified using the first AMF information.

Example 4: The apparatus, method, device, system, equipment, and/or article of manufacture of Example 3, that also includes transmitting, via the transceiver, truncation instructions that indicates values of the first number n and the second number m to the UE originating the first RA request in a non-access stratum (NAS) registration accept message.

Example 5: The apparatus, method, device, system, equipment, and/or article of manufacture of Example 3, that also includes transmitting, via the transceiver, truncation instructions indicating values of the first number n and the second number m to the UE originating the first RA request in a system information block (SIB).

Example 6: The apparatus, method, device, system, equipment, and/or article of manufacture of Example 3, in which the first connection request is a radio resource control (RRC) connection request, N is equal to 40, and (n+m) is equal to at least 8.

Example 7: The apparatus, method, device, system, equipment, and/or article of manufacture of Example 2, that also includes receiving, via the transceiver, an initial connection request from the UE originating the first RA request via the transceiver prior to receiving the first connection request. The initial connection request includes a second payload consisting of N bits and the second payload includes (N−1) MSBs and a predetermined UEID type indicator value in an LSB of the second payload. This example also includes transmitting truncation instructions to the UE originating the first RA request for generating the truncated identifier via the transceiver. The truncation instructions are transmitted in response to receiving the predetermined UEID type indicator value in the LSB of the second payload. In this example, the (N−1) MSBs of the second payload are not associated by the core network with a registered UE.

Example 8: The apparatus, method, device, system, equipment, and/or article of manufacture of Example 1 that also includes receiving, via the transceiver, a second RA request from a UE originating the second RA request. This example also includes transmitting, via the transceiver, a second RAR to the UE originating the second RA request based on receiving the second RA request. This example also includes receiving, via the transceiver, a second connection request associated with the second RA request. The second connection request includes a first portion of a temporary mobile subscriber identity (TMSI) of the UE originating the second RA request. This example also includes receiving, via the transceiver, a second portion of the TMSI of the UE originating the second RA request; This example also includes sending a second UE context request to the core network. The second UE context request includes the first and second portion of the TMSI of the UE originating the second RA request. In this example, the TMSI of the UE originating the second RA request indicates a second UE type of the UE originating the second RA request that is a non-bandwidth-limited (non-BL) UE type.

Example 9: The apparatus, method, device, system, equipment, and/or article of manufacture of Example 8, in which the UE originating the second RA request uses a radio configuration that is associated with either a non-BL enhanced-coverage UE (a CE UE) type or an ordinary UE type that is a non-BL UE and non-CE UE type.

Example 10: The apparatus, method, device, system, equipment, and/or article of manufacture of Example 9, in which the second connection request includes a second payload consisting of 40 bits. This example also includes, in response to an LSB of the second payload having a predetermined indicator value associated with a CE UE type, receiving 39 MSBs of the second payload as the first portion of a TMSI of the UE originating the second RA request. This example also includes receiving, in a transmission subsequent to the second connection request, via the transceiver, 9 bits of information as the second portion of the TMSI of the UE originating the second RA request.

Example 11: An apparatus, method, device, system, equipment, and/or article of manufacture for wireless communication as user equipment (UE) capable of communication with a base-station (BS) Example 11 includes receiving truncation instructions and transmitting, via a transceiver to the BS, in a first connection request, a truncated identifier generated according to the truncation instructions and based on a UE identifier (UEID) of the UE. This example also includes communicating with the BS via the transceiver using a communication configuration associated with a UE type indicated by the truncated identifier.

Example 12: The apparatus, method, device, system, equipment, and/or article of manufacture of Example 11 that also includes receiving, via the transceiver, RRC configuration information over a signaling radio bearer (SRB), the SRB configured according to the UE type indicated by the truncated identifier.

Example 13: The apparatus, method, device, system, equipment, and/or article of manufacture of Example 12 in which the truncated identifier comprises truncated access and mobility management function (AMF) information and at least part of a temporary mobile subscriber identity (TMSI) of the UE.

Example 14: The apparatus, method, device, system, equipment, and/or article of manufacture of Example 13 in which the UE uses a radio configuration associated with a bandwidth-limited (BL) UE type.

Example 15: The apparatus, method, device, system, equipment, and/or article of manufacture of Example 13 in which the truncation instructions include a first value n and a second value m. The truncated identifier has a length N in this example and includes a number corresponding to the first value n of least significant bits (LSBs) of an AMF set ID; a number corresponding to the second value m of least significant bits (LSBs) of an AMF set ID; and a number corresponding to (N−n−m) of LSBs of the TMSI of the UE.

Example 16: The apparatus, method, device, system, equipment, and/or article of manufacture of Example 15 in which the first connection request is a radio resource control (RRC) connection request, N is equal to 40, and (n+m) is equal to at least 8.

Example 17: The apparatus, method, device, system, equipment, and/or article of manufacture of Example 11 in which the truncated identifier includes 39 LSBs of a 5G-S-TMSI of the UE and a UEID type indicator bit having a value corresponding to a non-bandwidth-limited (non-BL) enhanced coverage UE type (a CE UE type).

Example 18: The apparatus, method, device, system, equipment, and/or article of manufacture of Example 17 in which the UE uses a radio configuration associated with the CE UE type.

Example 19: The apparatus, method, device, system, equipment, and/or article of manufacture of Example 11 in which receiving the truncation instructions comprises receiving a system information block (SIB) including the truncation instructions.

Example 20: The apparatus, method, device, system, equipment, and/or article of manufacture of Example 11 in which the UE communicates using a radio configuration associated with one or both of a BL UE type or CE UE type. This example also includes transmitting an initial connection request to the BS via the transceiver before transmitting the first connection request. The initial connection request has a payload consisting of N bits that includes (N−1) MSBs generated by the UE and a UEID type indicator bit having a value corresponding to one or both of the BL UE type or the CE UE type in an LSB of the payload.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed at a user equipment (UE) the method comprising:
   receiving truncation instructions;
   generating a truncated identifier based on the truncation instructions and based on a UE type of the UE, wherein the truncated identifier is indicative of the UE type of the UE;
   transmitting, in a first connection request, the truncated identifier; and
   communicating using a communication configuration associated with the UE type indicated by the truncated identifier.

2. The method of claim 1, further comprising:
   receiving RRC configuration information via a signaling radio bearer (SRB), the SRB being configured according to the UE type indicated by the truncated identifier.

3. The method of claim 1, wherein the truncated identifier comprises at least one of truncated access and mobility management function (AMF) information or part of a temporary mobile subscriber identity (TMSI) of the UE.

4. The method of claim 1, wherein the UE type is a bandwidth-limited (BL) UE type.

5. The method of claim 1, wherein the truncation instructions include a first value n and a second value m; and
   wherein the truncated identifier has a length N and includes:
   a number corresponding to the first value n of least significant bits (LSBs) of an access and mobility management function (AMF) set ID;
   a number corresponding to the second value m of least significant bits (LSBs) of an AMF pointer; and
   a number corresponding to (N−n−m) of LSBs of a temporary mobile subscriber identity (TMSI) of the UE.

6. The method of claim 5, wherein N is equal to 40 and (n+m) is equal to at least 8.

7. The method of claim 1, wherein the truncated identifier comprises 39 LSBs of a 5G-S-TMSI of the UE and a UE identifier (UEID) type indicator bit having a value corresponding to a non-bandwidth-limited (non-BL) enhanced coverage UE type (a CE UE type).

8. The method of claim 1, wherein receiving the truncation instructions comprises receiving a system information block (SIB) including the truncation instructions.

9. The method of claim 1, wherein transmitting the truncated identifier comprises:
   transmitting the truncated identifier generated based on the truncation instructions, based on a UE identifier (UEID) of the UE, and based on the UE type of the UE.

10. The method of claim 1, wherein the first connection request is a radio resource control (RRC) connection request message.

11. The method of claim 1, wherein communicating using the communication configuration associated with the UE type indicated by the truncated identifier comprises:
    communicating using the communication configuration based on UE capabilities associated with an access and mobility management function (AMF) for the UE type indicated by the truncated identifier.

12. The method of claim 11, wherein the first connection request is a radio resource control (RRC) connection request message of a random access procedure, and wherein communicating using the communication configuration based on the UE capabilities associated with the AMF comprises:
    communicating, prior to sending an RRC connection setup complete message of the random access procedure, using the communication configuration based on the UE capabilities associated with the AMF for the UE type indicated by the truncated identifier.

13. A user equipment (UE), comprising:
    at least one processor;
    at least one memory comprising instructions; and
    a transceiver;
    wherein the at least one processor is configured to execute the instructions to cause the UE to:
    receive, via the transceiver, truncation instructions;
    generate a truncated identifier based on the truncation instructions and based on a UE type of the UE, wherein the truncated identifier is indicative of the UE type of the UE;
    transmit, via the transceiver to a base station (BS), in a first connection request, the truncated identifier; and
    communicate with the BS via the transceiver using a communication configuration associated with the UE type indicated by the truncated identifier.

14. The UE of claim 13, wherein the at least one processor is further configured to cause the UE to:
    receive, via the transceiver, RRC configuration information via a signaling radio bearer (SRB), the SRB being configured according to the UE type indicated by the truncated identifier.

15. The UE of claim 13, wherein the truncated identifier comprises at least one of truncated access and mobility management function (AMF) information or part of a temporary mobile subscriber identity (TMSI) of the UE.

16. The UE of claim 13, wherein the truncation instructions include a first value n and a second value m; and
    wherein the truncated identifier has a length N and includes:
    a number corresponding to the first value n of least significant bits (LSBs) of an access and mobility management function (AMF) set ID;
    a number corresponding to the second value m of least significant bits (LSBs) of an AMF pointer; and
    a number corresponding to (N−n−m) of LSBs of a temporary mobile subscriber identity (TMSI) of the UE.

17. The UE of claim 13, wherein the truncated identifier comprises 39 LSBs of a 5G-S-TMSI of the UE and a UE identifier (UEID) type indicator bit having a value corresponding to a non-bandwidth-limited (non-BL) enhanced coverage UE type (a CE UE type).

18. The UE of claim 13, wherein the UE type is a bandwidth-limited (BL) UE type.

19. The UE of claim 13, wherein to transmit the truncated identifier, the at least one processor is further configured to cause the UE to:
    transmit, via the transceiver, the truncated identifier generated based on the truncation instructions, based on a UE identifier (UEID) of the UE, and based on the UE type of the UE.

20. The UE of claim 13, wherein the first connection request is a radio resource control (RRC) connection request message.

21. The UE of claim 13, wherein to communicate using the communication configuration associated with the UE type indicated by the truncated identifier, the at least one processor is further configured to cause the UE to:

communicate with the BS via the transceiver using the communication configuration based on UE capabilities associated with an access and mobility management function (AMF) for the UE type indicated by the truncated identifier.

22. The UE of claim 21, wherein the first connection request is a radio resource control (RRC) connection request message or a random access procedure, and wherein to communicate with the BS using the communication configuration based on the UE capabilities associated with the AMF, the at least one processor is further configured to cause the UE to:

communicate with the BS via the transceiver, prior to sending an RRC connection setup complete message of the random access procedure, using the communication configuration based on the UE capabilities associated with the AMF for the UE type indicated by the truncated identifier.

23. The UE of claim 13, wherein to receive the truncation instructions, the at least one processor is further configured to cause the UE to:

receive, via the transceiver, a system information block (SIB) including the truncation instructions.

\* \* \* \* \*